United States Patent
Akiyama et al.

(10) Patent No.: US 6,862,124 B2
(45) Date of Patent: Mar. 1, 2005

(54) SEMICONDUCTOR OPTICAL MODULATOR, MACH-ZEHNDER OPTICAL MODULATOR EMPLOYING THE SAME, AND METHOD OF MANUFACTURING SEMICONDUCTOR OPTICAL MODULATOR

(75) Inventors: Suguru Akiyama, Kawasaki (JP); Haruhisa Soda, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 10/314,969

(22) Filed: Dec. 10, 2002

(65) Prior Publication Data

US 2003/0138179 A1 Jul. 24, 2003

(30) Foreign Application Priority Data

Dec. 11, 2001 (JP) ......................................... 2001-377792

(51) Int. Cl.[7] .............................. G02F 1/03; G02F 1/035
(52) U.S. Cl. ........................ 359/248; 359/237; 359/245; 385/2
(58) Field of Search ................................ 359/237, 238, 359/254, 245, 248, 239, 48; 385/1–3, 14, 40, 129–132; 257/29, 298, 312, 480, 595–602; 372/48, 50

(56) References Cited

U.S. PATENT DOCUMENTS 6,600,842 B2 * 7/2003 Yamada .......................... 385/2

2003/0103709 A1 * 6/2003 Grinberg et al. ................ 385/2
2003/0190107 A1 * 10/2003 Walker ........................... 385/2

FOREIGN PATENT DOCUMENTS

JP          3422279          4/2003

* cited by examiner

Primary Examiner—Georgia Epps
Assistant Examiner—M. Hasan
(74) Attorney, Agent, or Firm—Armstrong, Kratz, Quintos, Hanson & Brooks, LLP

(57) ABSTRACT

A semiconductor optical modulator, a Mach-Zehnder optical modulator employing the same, and a method of manufacturing a semiconductor optical modulator that are suitable for high-speed baseband communication are provided. An optical waveguide core layer is formed in such a manner that it alternately crosses micro optical modulator elements and gap regions, which are formed by placing electrically insulating material at predetermined intervals on an electrically conductive substrate. The core layer is connected to a signal electrode portion via a conductive semiconductor portion in each micro optical modulator element. A ground electrode is connected to the core layer via the conductive substrate. Further, the signal electrode portions are connected in a series to form a signal electrode by means of in-between metal wirings. Conductive semiconductor material is located between the core layer and the electrodes. In the gap regions, the core layer is sandwiched between insulating semiconductor layers.

39 Claims, 24 Drawing Sheets

SEMICONDUCTOR OPTICAL MODULATOR, MACH-ZEHNDER OPTICAL MODULATOR EMPLOYING THE SAME, AND METHOD OF MANUFACTURING SEMICONDUCTOR OPTICAL MODULATOR

BACKGROUND OF THE INVENTION

1. Field of the Invention

The present invention generally relates to a semiconductor optical modulator, a Mach-Zehnder optical modulator employing the same, and a method of manufacturing a semiconductor optical modulator. More specifically, the present invention relates to a semiconductor optical modulator, a Mach-Zehnder optical modulator employing the same, and a method of manufacturing a semiconductor optical modulator that are suitable for high-speed baseband communication.

2. Description of the Related Art

As one of today's known devices that modulates continuous light based on waveforms of input electric signals, there is a Mach-Zehnder optical modulator made of $LiNbO_3$ (lithium niobate). One such Mach-Zehnder optical modulator 1000 is schematically shown in plan view (FIG. 1).

Referring to FIG. 1, a Mach-Zehnder optical modulator 1000 includes a phase modulator 1100, two optical couplers 1003 and 1005, and a pair of optical waveguides 1004 constituting an interference system.

FIG. 2 shows a cross-sectional view of the phase modulator 1100. Referring to FIG. 2, the phase modulator 1100 (made of $LiNbO_3$), which is a conventional type, includes a signal electrode 1108 and a ground electrode 1109, both Au-plated (or gold-plated), and a substrate 1102 made of $LiNbO_3$ as an insulating material. Each of the Au-plated electrodes 1108 and 1109 is laminated on a silica ($SiO_2$) film disposed between the Au-plated electrodes 1108 and 1109 and the substrate 1102. Further, an optical waveguide core 1103 is formed in the $LiNbO_3$ substrate 1102 by a Ti-diffusion process, etc.

In the above stated structure, when a voltage is applied between the Au plated signal electrode 1108 and the Au plated ground electrode 1109, the intensity distribution of the resulting electric field between the electrodes 1108 and 1109 is generally uniform. The distributed electric field is partly applied at the Ti-diffused optical waveguide core 1103, thereby causing a refractive index gradient on the incident light in this region.

The sectional configuration as shown in FIG. 2, is generally designed as a traveling-wave electrode type structure. By matching the input impedance to 50 ohms, reflection to the drive circuit (which is in the input side) is reduced, even when the high-frequency electric signal is input. However, when the $LiNbO_3$ material system is employed in that type of device as shown in FIG. 2, the typical device length is around 40 mm, which is very long.

Aside from the above mentioned type of optical modulator that employs $LiNbO_3$ material system there is another type of optical modulator that utilizes semiconductor material. When semiconductor material is employed, the device length is from several dozen micrometers through several millimeters. It means that the device length of optical modulators made of semiconductor material is shorter than those optical modulators made of $LiNbO_3$. Further, the employment of semiconductor material results in a capability of integration with a light source that is also made of semiconductor material, for example, a laser diode (LD).

A structure of an optical modulator made of semiconductor (or semiconductor optical modulator) 1110 is schematically shown in FIGS. 3 and 4. First, referring to FIG. 3, the semiconductor optical modulator 1110 includes an optical-waveguide-core layer 1113, an electrically-conductive semiconductor layer 1115, an electrically conductive substrate 1112, a metal electrode (signal) 1118 and a metal electrode (ground) 1119. The semiconductor layer 1115 and the substrate 1112 are located on the opposite sides of the core layer 1113. Further, the electrode (signal) 1118 and the electrode (ground) 1119 are located so as to sandwich the combination of the semiconductor layer 1115, the core layer 1113 and the substrate 1112. More specifically, the electrode (signal) 1118 is located on the semiconductor layer 1115 and the substrate 1112 is located on the electrode (ground) 1119. In this structure, high-frequency electric signals from a high-frequency electric signal source 1114 are input into the electrodes 1118 and 1119, thereby providing a predetermined modulation for the light (continuous light).

This type of optical modulator 1110 may be utilized as an absorption-type, single-unit optical modulator. Alternatively, it may be used as a phase modulator part of a Mach-Zehnder optical modulator, as shown in FIG. 1.

FIG. 4 shows a layered structure as seen in another section perpendicular to the optical axis of the optical modulator 1110 shown in FIG. 3. The layered structure shown in FIG. 4 includes an n-type InP layer (n-InP cladding layer) 1122, a thin i-InGaAsP optical-waveguide core layer 1123 and a p-type InP layer (p-InP cladding layer) 1125, wherein the n-InP layer 1122 and the p-InP layer 1125 sandwich the i-InGaAsP optical-waveguide-core layer 1123. The i-InGaAsP optical waveguide core layer 1123 forms the optical waveguide core layer 1113.

The i-InGaAsP optical waveguide core layer 1123 in the above structure is an undoped one and, therefore, it can be regarded as a substantially insulating body. In contrast, the n-type InP layer 1122 and the p-type InP layer 1125 (which sandwich the i-InGaAsP optical waveguide core layer 1123) are substantially conductive bodies. Therefore, when a reverse bias voltage is applied between a pair of electrodes 1128, 1129 (both being gold-plated and situated respectively on top of and under the element structure, i.e., respectively on the top face of the p-InP layer 1125 and on the bottom face of the n-type InP layer 1122), the electric field takes place in a concentrated manner at the undoped i-InGaAsP optical waveguide core layer 1123 and therefore, the electric field within the p-InP layer 1125 and the n-type InP layer 1122 is almost non-existent (or negligible).

Consequently, the i-InGaAsP optical waveguide core layer 1123 can be regarded as a parallel plate capacitor that has p-type and n-type semiconductor electrodes. The predetermined thickness (shown in FIG. 4) of the i-InGaAsP optical waveguide core layer 1123 is 0.5 micrometers or less, which is very thin in order to reduce the driving voltage. Therefore, this capacitor has a large electric capacitance per unit length. As a result, the semiconductor optical modulator 1110, having a layer structure as shown in FIG. 4, has a very large capacitance per unit length thereof.

The structures as shown in FIGS. 3 and 4 are in accordance with a lumped parameter device concept. In contrast, a semiconductor optical modulator that has a traveling-wave electrode type structure is also known, in addition to those employing $LiNbO_3$. This type of optical modulator is also designed in such a manner to be matched toward the 50-ohm input impedance. However, the device length of such an optical modulator is about 1 mm, which is longer than that of the above lumped-parameter type semiconductor optical modulator 1110.

Schematic views of the device structure of this traveling wave electrode type optical modulator are shown in FIGS. 5 and 6. As is easily seen, the layered structure shown in the sectional view of FIG. 6 is quite similar to the structure of the lumped-parameter type semiconductor optical modulator 1110 shown in FIG. 4 in that it contains a structure that includes electrically-conductive p-type and n-type InP layers that sandwich a thin optical waveguide core layer made of undoped InGaAsP.

In a semiconductor optical modulator 1130 shown in FIG. 6, a 0.5-micrometer undoped InP layer (i-InP layer 1143a), which can be regarded substantially as an insulating body, is formed under the i-InGaAsP optical waveguide core layer 1143b. Therefore, the electric field caused by the driving voltage on the device is prevented from concentrating on the i-InGaAsP optical waveguide core layer 1143b. As a result, there is a relatively weak electric field uniformly distributed in both the i-InGaAsP optical waveguide core layer 1143b and the i-InP layer 1143a. Because of this layered structure, the electric capacitance per unit length of the semiconductor optical modulator 1130 is smaller, as compared to those without undoped InP layers.

Further, the input impedance is largely dependent on the capacitance per unit length of the sectional layered structure and has a tendency to become smaller when the sectional capacitance becomes larger. Therefore, in the structure as shown in FIG. 4, which has nothing between the i-InGaAsP optical waveguide core layer 1123 and the n-type InP layer 1122, the capacitance becomes very large, which makes the input impedance too small. In contrast, in the structure shown in FIG. 6, the i-InP layer 1143a is formed between the i-InGaAsP optical waveguide core layer 1143b and an n-InP cladding layer 1142 for the purpose of reducing the capacitance and achieving the relatively desirable input impedance value, which is, for instance, in the neighborhood of 50 ohms.

As a matter of fact, however, the capacitance of the semiconductor optical modulator having the layered structure as stated above is still too large, which causes the problem that the input impedance becomes too small, as seen in other conventional semiconductor optical modulators. This is the cause of a problem, for example, where an impedance matching must be made for a drive circuit for a device configured in a 50-ohm-based system, and the semiconductor optical modulator is not capable of being matched to the 50-ohm input impedance. In this type of problem, the high frequency electric signals that are provided for the purpose of optical modulation are returned to the drive circuit due to reflection phenomena.

One idea of alleviating this problem is to reduce the device length of the semiconductor optical modulator so as to reduce the capacitance. With a configuration based on such an idea, however, there arises a problem: the amount of light-absorption change or light-wave-phase change tends to decrease under a fixed driving voltage. In order to compensate for such decrease, the driving voltage must be made higher.

In contrast, the driving voltage of a traveling wave electrode type semiconductor optical modulator can be reduced because of its long device length. It is, however, still practically difficult to design a traveling wave electrode type semiconductor optical modulator that achieves the around 50-ohm input impedance. This is because the capacitance per unit length is still too large, even in the sectional layered structure that has the i-InP layer 1143a as an insulating body under the i-InGaAsP optical waveguide core layer 1143b.

Therefore, there is also a problem wherein the high frequency electric signals are returned from the device because of reflection phenomena due to the input impedance being less than 50 ohms. In fact, according to a calculation employing the finite element method, etc., the input impedance of the sectional layered structure shown in FIG. 6 is around 25.5 ohms, which clearly shows the existence of the above stated problem because this is far from achieving 50 ohms.

FIG. 7 shows, via a dotted line, the s11 reflection characteristics obtained when high frequency electric signals are input into the semiconductor optical modulator 1130 illustrated in FIG. 6. The s11 reflection characteristics indicate the ratio of the output electric signal intensity and the input electric signal intensity when electric signals output from a port 1 are returned to the same port 1 due to reflection phenomena.

Referring to FIG. 7, the s11 reflection characteristics of the semiconductor optical modulator 1130 illustrated in FIG. 6 become worst (i.e., minus 5.3 decibel) at the frequency value of 17 GHz, where a large proportion of the high frequency electric signal provided thereto is not properly input and is returned toward the drive circuit due to reflection.

A possible way of solving this problem is to increase the thickness of the i-InP layer 1143a in FIG. 6. However, with a configuration based on such an idea, there arises a problem: the intensity of the electric field applied to the undoped InGaAsP layer of the i-InGaAsP optical waveguide core layer 1143b further decreases under a fixed driving voltage, which means that its driving voltage must be increased to a much higher level in order to provide the required intensity of the electric field.

In short, according to the conventional technologies about a semiconductor optical modulator, regardless of whether it is a lumped parameter type or a traveling wave electrode type, it is difficult to achieve both the reduction of return of the high frequency electric signal from the device occurring due to reflection phenomena and the reduction of the required driving voltage at the same time.

SUMMARY OF THE INVENTION

It is therefore an object of the present invention to provide a semiconductor optical modulator, a Mach-Zehnder optical modulator employing the same, or a method of manufacturing a semiconductor optical modulator, by which both the reduction of the high frequency electric signal reflection from the element and the reduction of the driving voltage can be achieved.

The object of the present invention can be achieved based on a semiconductor optical modulation device, comprising:
an optical waveguide having an optical axis, said optical waveguide formed on a surface of a semiconductor substrate; and
at least two types of optical modulation elements formed on said semiconductor substrate,
wherein said at least two types of optical modulation elements are arrayed so that there are a plurality of said optical modulation elements along said optical waveguide in the direction of said optical axis.

Such a semiconductor optical modulation device is advantageous because the reflection of high frequency electric signals from the device can be reduced and the driving voltage can be reduced.

This is because the different types of optical modulation elements can have different capacitances per unit length, thereby enabling the input impedance as a design factor of the entire device to become closely matched to the desired input impedance (for example, 50 ohms). The input impedance closer to the desired input impedance leads to less reflection of the inputted high frequency electric signals. Thus, even if the device of the present invention is longer than conventional ones, the device of the present invention can have reduced reflection. Therefore, a large number of optical modulation elements whose effect integrated along the optical axis is sufficient to make the required amount of optical modulation can be employed in the device, where each optical modulation element can be reduced in effect, which means that the driving voltage that is common to the optical modulation elements can be reduced.

In another aspect of the present invention there is provided a Mach-Zehnder optical modulation device, comprising:

a first optical waveguide that comprising a first light path;

a second optical waveguide comprising a second light path;

a first coupler that divides an incoming ray of light into said first light path and said second light path;

a second coupler that couples said first optical waveguide and said second optical waveguide; and a first semiconductor optical modulation device formed along said first optical waveguide, said first semiconductor optical modulation device comprising:

an optical waveguide part having an optical axis, said optical waveguide part formed on a surface of a semiconductor substrate; and at least two types of optical modulation elements formed on said semiconductor substrate, wherein said at least two types of optical modulation elements are arrayed so that there are a plurality of said optical modulation elements along said optical waveguide part in the direction of said optical axis.

Such a Mach-Zehnder optical modulation device is advantageous because the reflection of high frequency electric signals from the semiconductor optical modulation device can be reduced and the driving voltage can be reduced, which is especially desirable for a Mach-Zehnder optical modulation device.

This is because the different types of optical modulation elements can have different capacitances per unit length, thereby enabling the input impedance as a design factor of the entire first semiconductor optical modulation device to become closely matched to the desired input impedance. The input impedance closer to the desired input impedance leads to less reflection of the inputted high frequency electric signals. Thus, even if the first semiconductor optical modulation device of the present invention is longer than conventional ones, the first semiconductor optical modulation device of the present invention can have reduced reflection. Therefore, a large number of optical modulation elements whose effect integrated along said optical waveguide part in the direction of the optical axis is sufficient to make the required amount of optical modulation can be employed in the first semiconductor optical modulation device, where each optical modulation element can be reduced in effect, which means that the driving voltage that is common to the optical modulation elements can be reduced.

In still another aspect of the present invention, there is provided a method of manufacturing a semiconductor optical modulation device, comprising:

a) a first step of forming an optical waveguide layer on a first semiconductor layer, wherein said first semiconductor layer is of a first conductivity type;

b) a second step of forming a second semiconductor layer on said optical waveguide layer, wherein said second semiconductor layer is of a second conductivity type;

c) a third step of forming a plurality of spaced-apart recessed areas at predetermined intervals by patterning said second semiconductor layer;

d) a fourth step of filling up said recessed areas with a semi-insulating semiconductor layer;

e) a fifth step of forming a mesa structure by patterning a surface, said surface being formed in said fourth step and being defined by said second semiconductor layer and said semi-insulating semiconductor layer that exist alternately and repeatedly at said predetermined intervals; and f) a sixth step of forming a metal wiring on said mesa structure, bringing said metal wiring into contact with said second semiconductor layer.

Such a manufacturing method can provide the inventive semiconductor optical modulation device that advantageously shows reduced reflection of high frequency electric signals from the device well as reduced driving voltage.

This is because the type of an optical modulation element that can be defined between the first semiconductor layer and the metal wiring in the region where the metal wiring is in contact with the second semiconductor layer is different from the type of another optical modulation element that can be defined having the semi-insulating semiconductor layer between the first semiconductor layer and the metal wiring. The different types of optical modulation elements can have different capacitances per unit length, thereby enabling the input impedance as a design factor of the entire semiconductor optical modulation device to become closely matched to the desired input impedance (for example, 50 ohms). The input impedance closer to the desired input impedance leads to less reflection of the inputted high frequency electric signals. Thus, even if the semiconductor optical modulation device manufactured according to the present invention is longer than conventional ones, the device manufactured according to the present invention can be an improved one in reducing the reflection. Therefore, a large number of optical modulation elements whose effect integrated along the optical axis is sufficient to make the required amount of optical modulation can be formed in the device, where each optical modulation element can be reduced in effect, which means that the driving voltage that is common to the optical modulation elements can be reduced.

Other features that may be employed to help further achieve the objects together with the advantageous effects of the present invention will become apparent by reference to the following detailed description when considered in connection with the accompanying drawings.

DETAILED DESCRIPTION OF THE PREFERRED EMBODIMENTS

Figure 1:
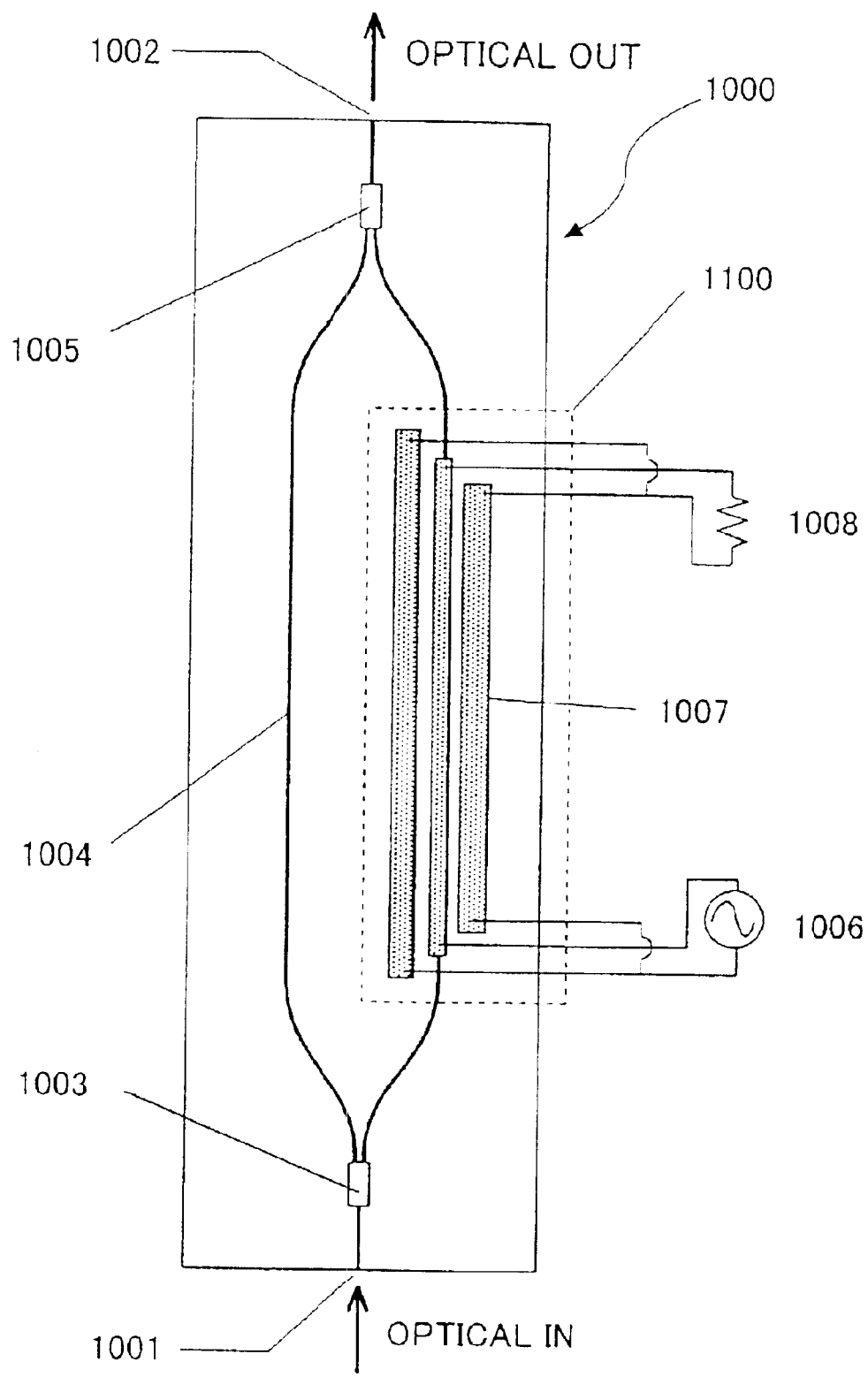
FIG. 1 is a block diagram showing a conventional Mach-Zehnder optical modulator 1000.
Figure 2:
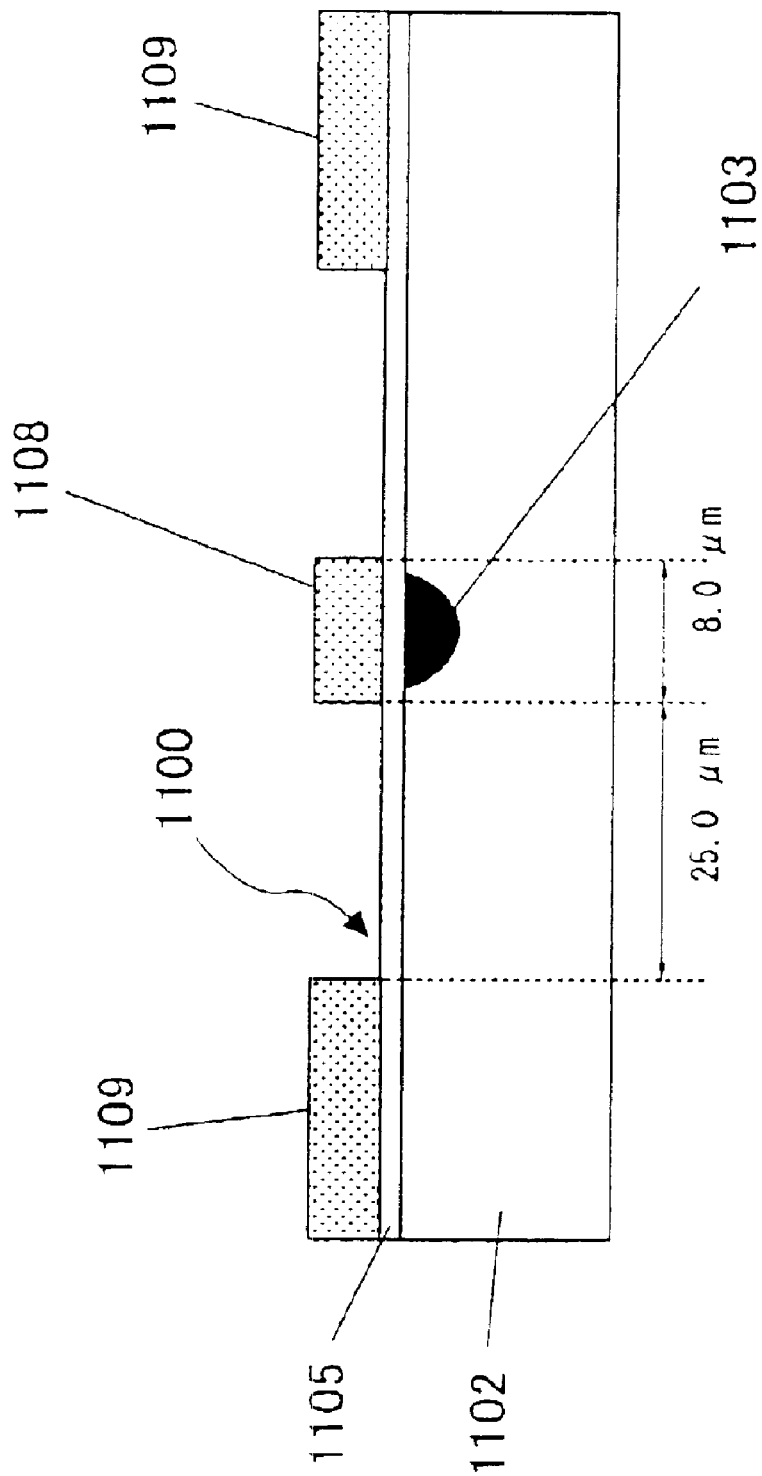
FIG. 2 is a section view showing a layered structure of a conventional phase modulation device 1100 employing a LiNbO$_3$-based material, used in the Mach-Zehnder optical modulator of FIG. 1.
Figure 3:
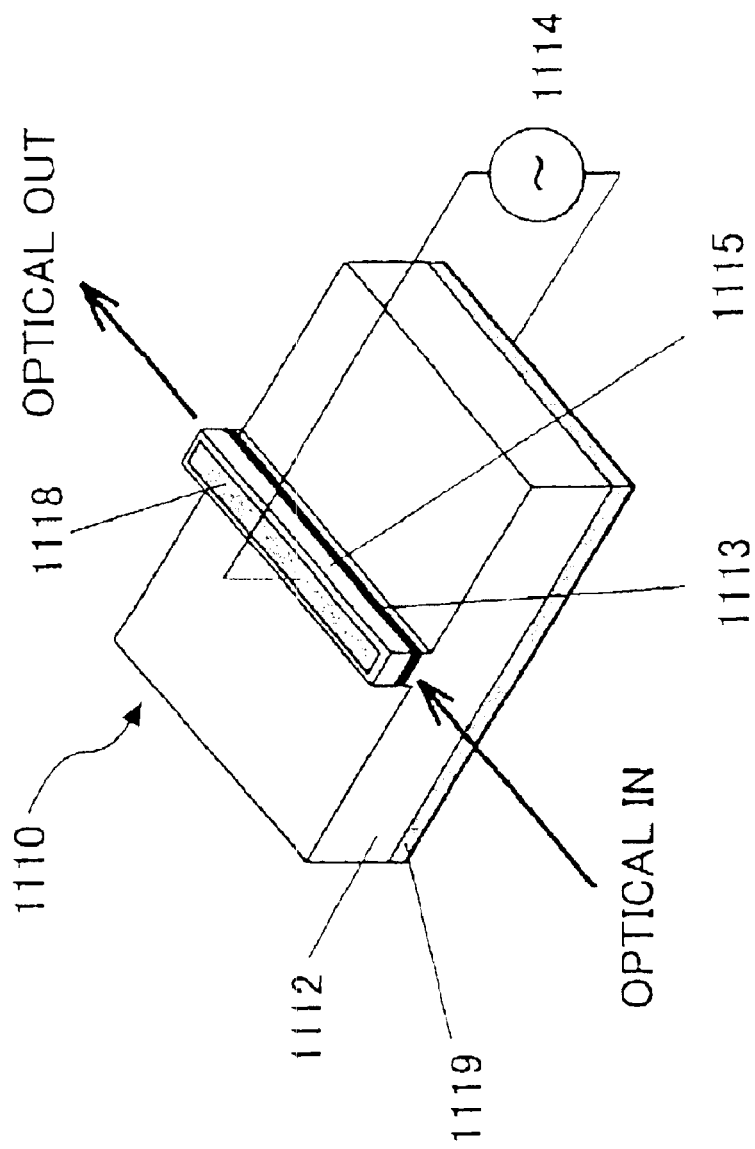
FIG. 3 is a perspective view of a conventional lumped-parameter type semiconductor optical modulator 1110.
Figure 4:
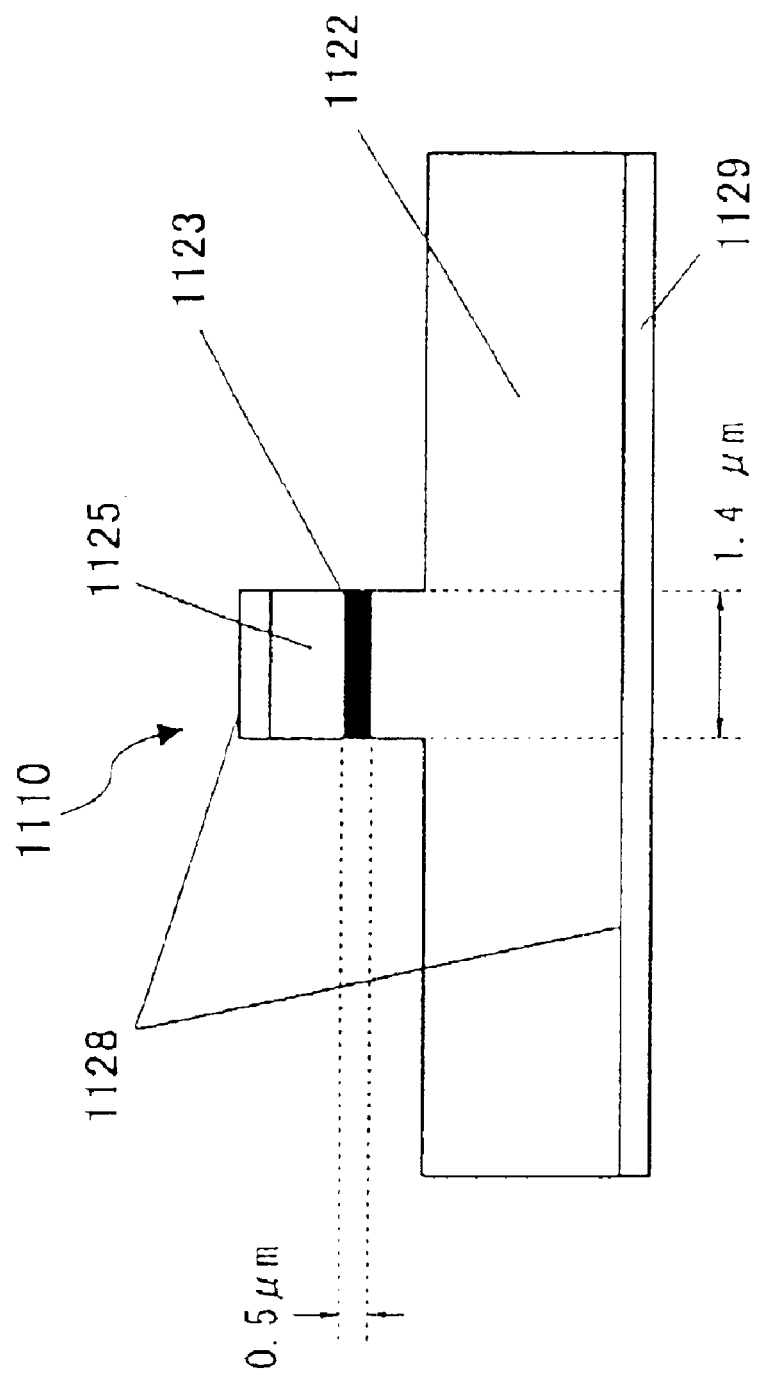
FIG. 4 is a section view showing a layered structure of the conventional lumped-parameter type semiconductor optical modulator of FIG. 3.
Figure 5:
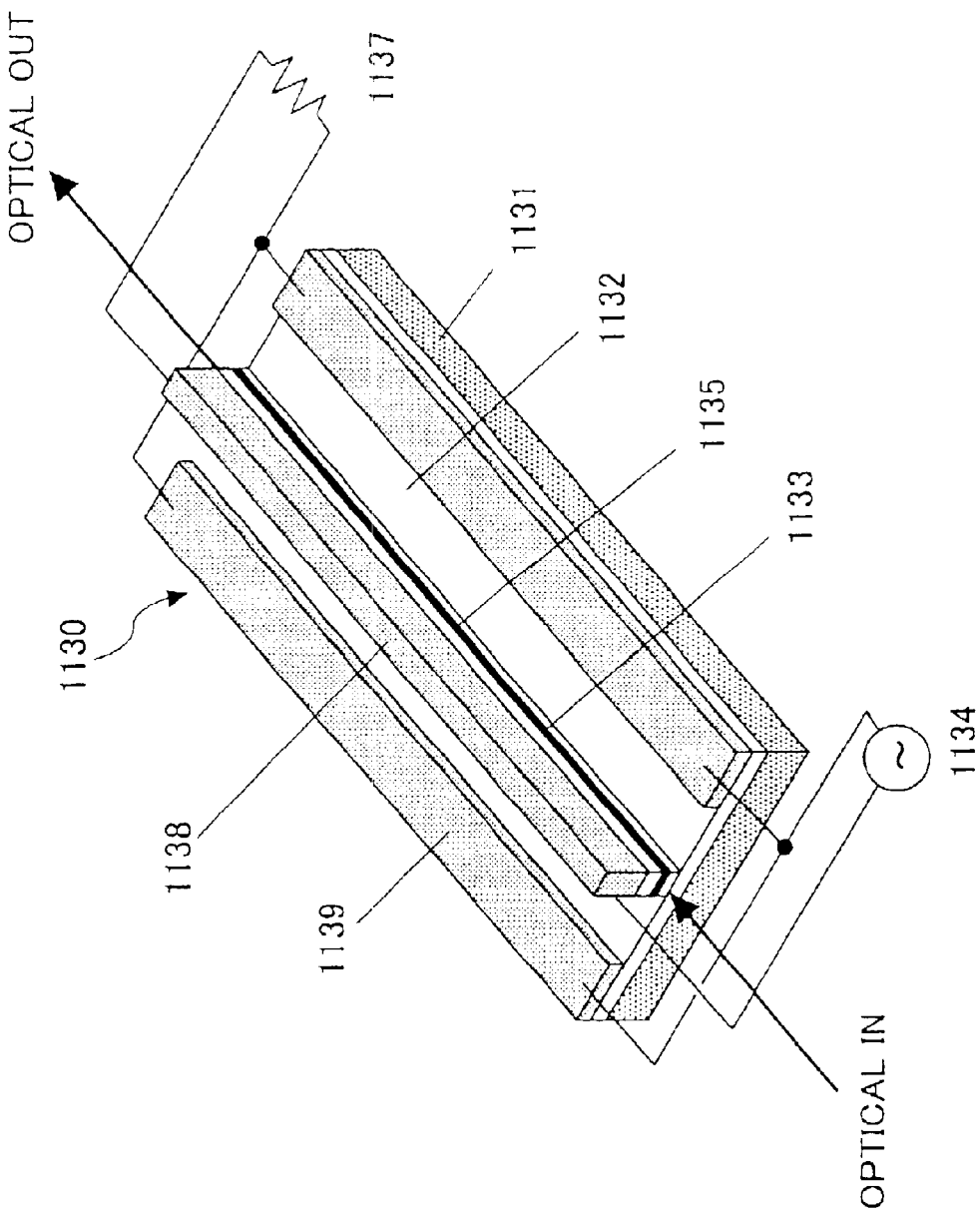
FIG. 5 is a perspective view of a conventional traveling-wave-electrode type semiconductor optical modulator 1130.
Figure 6:
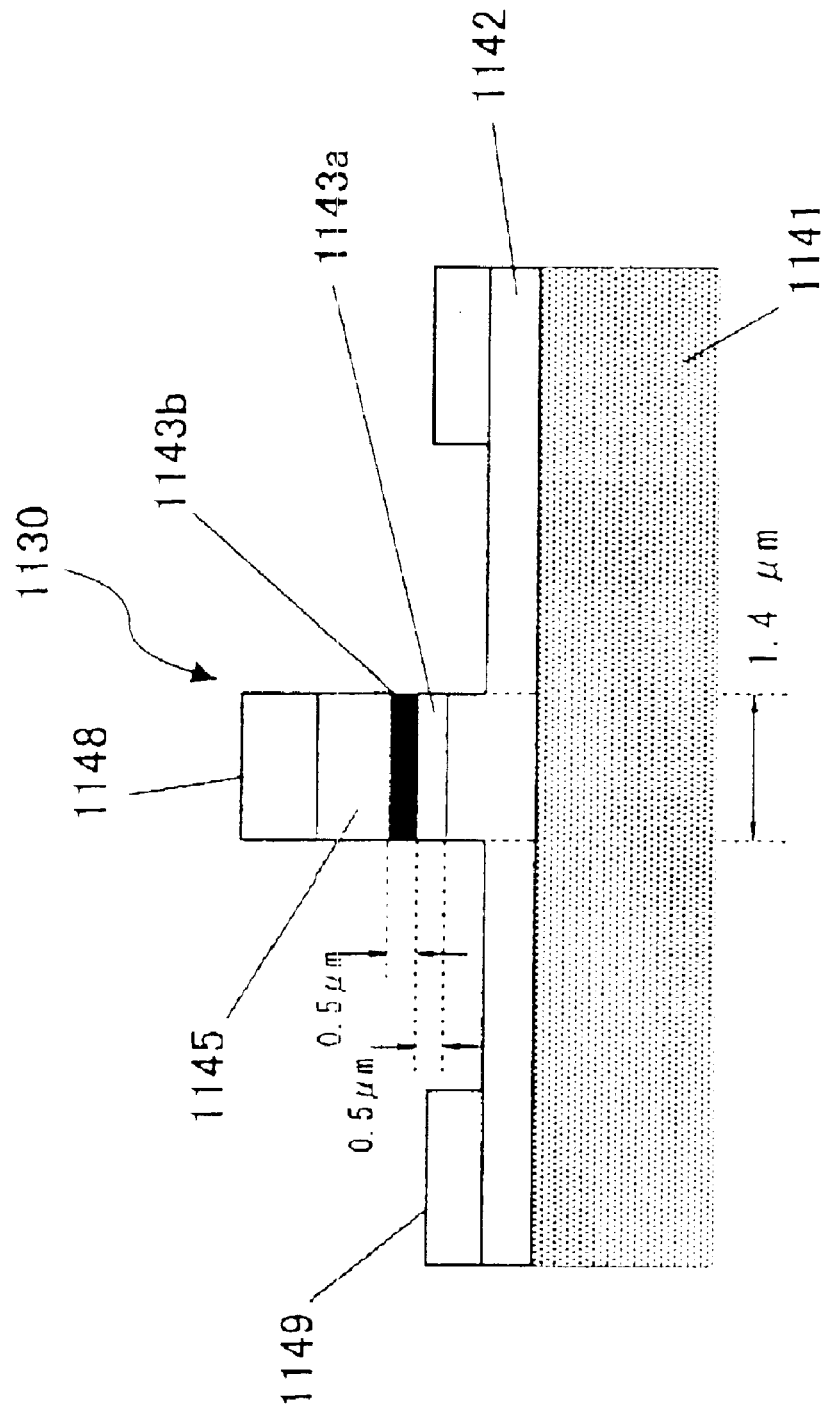
FIG. 6 is a section view showing a layered structure of the conventional traveling wave electrode type semiconductor optical modulator of FIG. 5.

Now, before describing the preferred embodiments one by one in detail, the basic idea of the present invention is discussed in detail below. The present invention typically relates to a semiconductor optical modulation device and a manufacturing method thereof, wherein the semiconductor optical modulation device can be utilized, for example, as an optical modulator in an optical transmitter of an optical communication system. The semiconductor optical modulation device is capable of modulating continuous light based on waveforms of electric input signals (in the form of input voltages) in the ultra high-speed communications whose speed is 10 through 40 Gbits/sec. or even higher.

In order to acquire such a capability, the present invention provides a structure that has a plurality of extremely small optical modulation elements (hereinafter referred to as micro optical modulation elements) connected together in series in the direction of their optical axes. The micro optical modulation elements make up the entirety of a single optical modulation device so that the structure as a whole can function as an optical modulation device. Thus, in the descriptions below, the term "the optical axis" indicates an imaginary line in the travelling direction of light waves that are to be modulated.

According to the present invention, a desired value of the input impedance of the semiconductor optical modulation device is achieved, where the modulation device (or the micro modulation elements as a whole) has a capability of producing sufficient electro-optic effect. This is done, for example, by providing some of the above micro optical modulation elements with sufficiently large capacitance by their configurations thereof and by providing the others of the above micro optical modulation elements with sufficiently small capacitance. In the descriptions below, the micro optical modulation elements that have sufficiently large capacitance are referred to as "micro optical modulator elements" or "(micro) optical modulation regions", while the micro optical modulation elements that have sufficiently small capacitance are termed "gap elements" or "gap regions".

Thus, according to the present invention, the plurality of micro optical modulator elements are utilized to modulate the incoming light accumulatively by the electro-optic effect. The plurality of gap elements are utilized to achieve the desired value of the impedance of the overall semiconductor optical modulation device.

More specifically, according to the invention, the gap elements whose sectional structures are different from the micro optical modulator elements (or the optical modulation regions) are respectively located between a corresponding pair of the micro optical modulator elements. Thus, each micro optical modulator element is electrically connected to a next one and/or a previous one via a corresponding gap element located therebetween. The capacitance of the gap element is set smaller than the micro optical modulator element. In this manner, the input impedance of the overall device configured in this manner is made closer to the value of 50 ohm than that of a semiconductor optical modulator that is configured by a mere combination of the micro optical modulator elements (i.e., by directly uniting the micro optical modulator elements without the gap elements).

In other words, such a semiconductor optical modulation device is advantageous because the reflection of high frequency electric signals from the device is reduced and the driving voltage is reduced, specifically due to the capability of configuring a desirable input impedance on the overall device based on the small capacitance of the second optical modulation elements in the semiconductor optical modulation device whose plurality of first optical modulation elements modulate the light accumulatively.

The total number of the micro optical modulator elements united in the semiconductor optical modulation device of the present invention is predetermined in such a manner that the light that has gone through the overall device has sufficient intensity and sufficient amount of phase change. The capacitance of each micro optical modulator element is set in each appropriate range whose upper limit is sufficiently small. Therefore, it is necessary to shorten the element length of each micro optical modulator element sufficiently. In the illustrative micro optical modulator element of the present invention, a rough standard of the element length is equal to or less than a quarter of the wavelength of the high frequency electric input signal within the element. As will be appreciated by one of ordinary skill in the art, this value (one fourth of the wavelength) is only an illustrative rough standard and can be modified within the scope of the present invention without departing from its basic intent. Also, it should be noted that each micro optical modulator element having such a short element length can be regarded as an electric lumped parameter element.

The device structure as stated above is a concept of a semiconductor optical modulation device according to the invention. Thus, as far as such a conceptual structure is satisfied, detailed structural parameters of the semiconductor optical modulation device according to the invention may be set in the same design policy as the conventional semiconductor optical modulators shown in FIGS. 3 through 6.

For example, it is preferable to have an optical waveguide core layer that provides a large refractive index gradient under a fixed (or constant) electric field. MQW (Multiple Quantum Well) including InGaAsP (or even other MQW including other constituent material) that is lattice-matching with respect to the InP substrate may be used for the core layer.

Further, it is preferable to minimize the loss of the high frequency electric signals that are transmitted through the micro optical modulator elements and the gap elements. For this purpose, there may be a structure having a relatively thick Au-plating (i.e., 10 micrometers or thicker) on each micro optical modulator element.

Further, it is preferable to arrange the device structure of the semiconductor optical modulation device according to the invention so that the delay time during which the high frequency electric signals are transmitted through the micro optical modulator elements and the gap elements are as close as possible to the time that is required for transmission of light to go through the micro optical modulator elements and the gap elements.

More specifically, according to the present invention, it is preferable to design the sectional structures of the micro optical modulator elements and gap elements, the length of the gap elements, and the shape of metal wiring that electrically connects the micro optical modulator elements. It is preferable to make the design in such a manner that $t_o=t_e$ is satisfied, wherein $t_o$ denotes the time length required for transmission of light to go through a first micro optical modulator element and its following gap element and arrive at a next micro optical modulator element (hereinafter referred to as "second micro optical modulator element") adjacent the gap element (i.e., the time length between the time when the light is input at the first micro optical modulator element and the time when the light is input at the second micro optical modulator element), and $t_e$ denotes the time length between the time when an electric signal is input at the first micro optical modulator element and the time when the electric signal is input at the second micro optical modulator element due to the transmission of the electric signal through the first micro optical modulator element and its following gap element.

Figure 8:
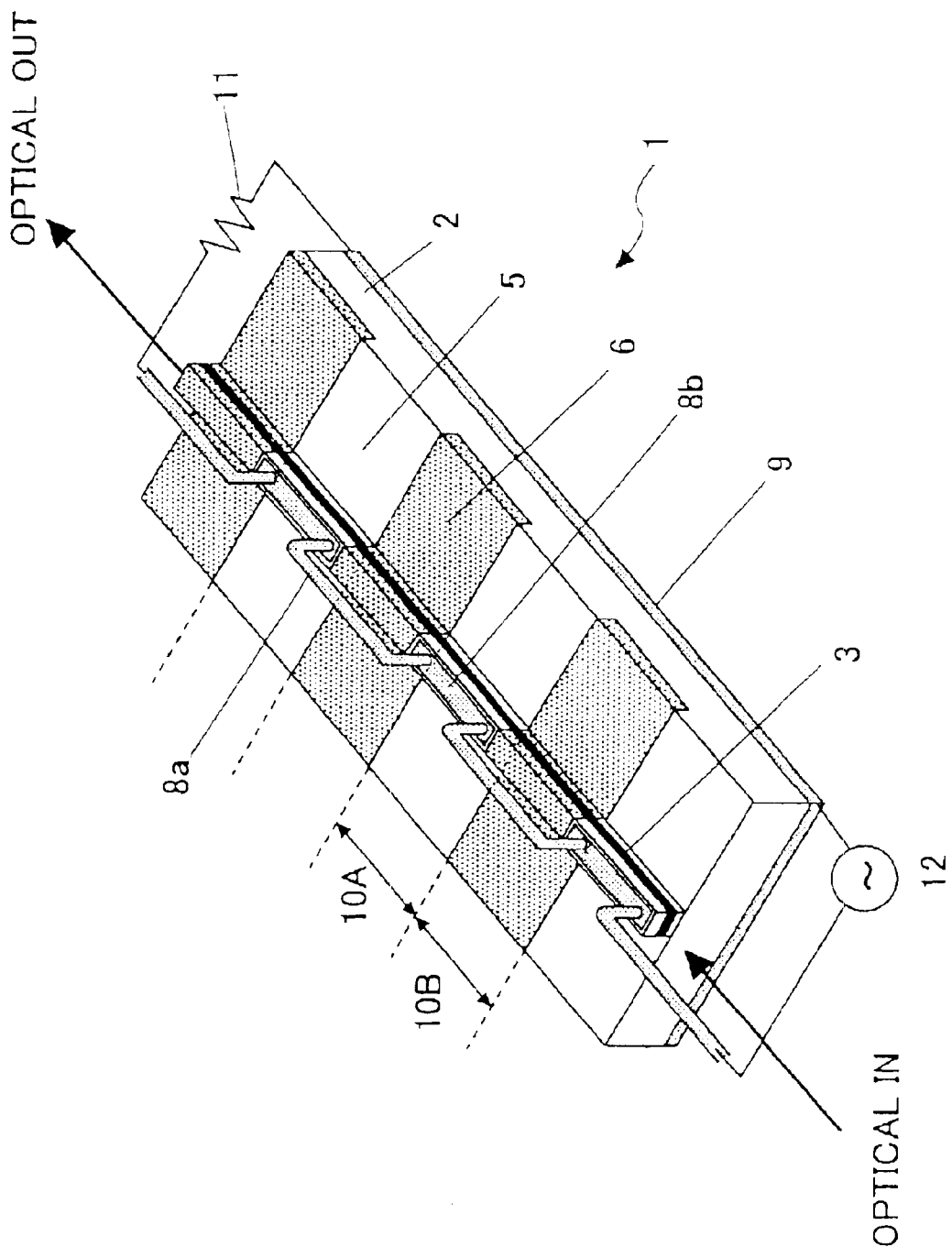
FIG. 8 is a schematic view showing a conceptual structure for semiconductor optical modulation devices (phase modulation devices) 1 according to the present invention.

A structure according to such design is schematically and partially shown in FIG. 8. This illustrative view is partial in that it (FIG. 8) shows only three micro optical modulator elements and only three gap regions due to space limitations. The micro optical modulator elements and the gap regions are alternately located along the optical axis in FIG. 8.

Referring to FIG. 8, a phase modulation device 1 that is in accordance with the conceptual structure of the present invention is shown. The phase modulation device 1 includes an electrically conductive substrate 2 and an optical waveguide core layer 3 formed on the substrate 2. It also includes insulating material portions 6 located at predetermined intervals on the substrate 2, thereby defining micro optical modulator elements 10A (corresponding to the intervals) and gap regions 10B (corresponding to the insulating material portions 6) alternately formed. The predetermined intervals do not necessarily have to be equal to each other but can be equal to each other. The optical waveguide core layer 3 extends longitudinally along the substrate 2 and, therefore, it intersects the micro optical modulator elements 10A and the gap regions 10B alternately.

The portions of the optical waveguide core layer 3 that are within the micro optical modulator elements 10A are connected to metal electrodes (signal) 8b via respective electrically conductive semiconductor portions 5 and are also connected to a metal electrode (ground) 9 via the electrically conductive substrate 2. The metal electrodes (signal) 8b are thus respectively provided for each micro optical modulator elements 10A and are connected one after another by means of metal wirings 8a.

Therefore, each micro optical modulator element 10A has electrically conductive semiconductor material between the optical waveguide core layer 3 and the metal electrode 8b (for signal). The element 10A also has electrically conductive semiconductor material between the core layer 3 and the electrode 9 (for ground). In contrast, each gap region 10B has electrically insulating semiconductor material that sandwiches the optical waveguide core layer 3. Therefore, capacitance of the gap regions 10B is smaller than that of the micro optical modulator elements 10A.

Consequently, in the structure as stated above, when a potential difference is applied between each signal electrode 8b and the ground electrode 9, the resulting electric field is concentrated in the core layer 3 only and is nonexistent (or negligible) in the electrically conductive semiconductors 5. In contrast, when a potential difference is applied between each metal wiring (air bridge) 8a and the ground electrode 9, the resulting electric field takes place in an almost uniform manner across a relatively long distance between the upper portion of the device (i.e., the metal wiring 8a) and the electrically conductive substrate 2 (which is under the core layer 3).

In other words, such a semiconductor optical modulation device is advantageous because the reflection of high frequency electric signals from the device is reduced and the driving voltage is reduced, and it is advantageous specifically because of the capability of making the electric field produced by applying the voltage concentrate into the optical waveguide that can reduce the driving voltage further effectively and can also reduce the device length.

Further, according to the present invention, the electrically conductive substrate 2 as shown in FIG. 8 is advantageously made of InP material or GaAs material. Still further, the core layer 3 formed on the substrate 2 is made of lattice-matching material whose lattice structure matches well with the material that constitutes the substrate 2 as stated above. The extent of lattice matching is preferably in the range whose extent of lattice mismatching does not exceed 1.0 percent.

Further, in order to reduce the capacitance in each gap region, the insulating material 6 is located in the form of a semi-insulating semiconductor layer 6 preferably made of undoped or Fe-doped, InP or GaAs, between the core layer 3 and each metal wiring (air bridge) 8a in each gap region.

Preferably, the length of each micro optical modulator element 10A taken along the optical axis is 30 through 200 micrometers and that of each gap region 10B is 15 through 650 micrometers, both design factors being considered in view of the wavelength of the high frequency electric signals that are to be input into the optical semiconductor device 1. Further, the design factors are preferably considered in such a manner that the length of the gap region 10B taken along the optical axis divided by that of the micro optical modulator element 10A is in the range of 0.5 through 3.5. Further preferably, the core layer 3 is configured in the form of a multiple quantum well (MQW) layer employing InGaAsP that is substantially lattice-matching with respect to the InP substrate. Further preferably, this MQW is made of material whose equivalent refractive index is in the range of 3.2 through 3.3 for incoming light whose vacuum wavelength is in the range of 1.50 through 1.60 micrometers.

In each micro optical modulator element 10A, the core layer 3 is 0.5 through 2.0 micrometers thick and 1.0 through 2.0 micrometers wide. Further preferably, the core layer 3 is encased in a high-resistance semiconductor layer.

Further preferably, in each gap region, the corresponding metal wiring 8a forming an air bridge in shape is spaced apart from the substrate by at least 0 through 10.0 micrometers.

Because of the overall configuration based on the aforementioned basic ideas provided by the present invention as stated above, it can be said that the invention generally works as follows: (a) the entire structure including the micro semiconductor optical modulator elements can work as a single device, which functions as a semiconductor optical modulator; (b) the reflection (of the high frequency electric signals) from the semiconductor optical modulator can be reduced; and (c) the driving voltage of the semiconductor optical modulator can be reduced.

Next, the reason why the invention works as above is discussed. First, the reason why the semiconductor optical modulator having the structures as schematically stated above (i.e., the semiconductor optical modulation device according to the present invention) can work as a single device is described below.

When the semiconductor optical modulation device according to the present invention is used as a general optical modulator, continuous light is input at one end face of the semiconductor optical modulation device into the optical waveguide core layer 3 as shown in FIG. 8. In order to modulate the thus inputted light, a high frequency electric signal is input at the metal electrode 8b of the most upstream micro optical modulator element 10A (i.e., the micro optical modulator element 10A that is at the same end of the modulation device). The resulting electro-optic effect causes either an absorption coefficient gradient or a refractive index gradient in the optical waveguide core layer 3 within the micro optical modulator element 10A. Therefore, when the input light travels through the first micro optical modulator element 10A, either the intensity or the phase of the light is slightly changed.

Thereafter, the high frequency electric signal is input into the next (or the second) micro modulator element 10A via a metal wiring 8a of a gap region 10B. The light whose phase or intensity has been slightly changed in the first micro modulator element 10A is also input into the next (or the second) micro modulator element 10A via the core layer 3 of the gap region 10B. Therefore, in this next (or second) micro modulator element 10A, the intensity or the phase of the light is further slightly changed. Thus, the effected changes are integrated. Further, the light and the high frequency electric signal are arranged to travel in such a manner that they are input into each micro modulator element 10A and each gap region 10B as synchronously as possible.

Thereafter, in the same way, the light and the high frequency electric signal travel through further gap regions 10B one after another into respective contiguous micro modulator elements 10A. Thus, during the course of travelling through micro modulator elements 10A one after another via respective gap regions 10B, changes in the intensity or the phase of the light are integrated.

Consequently, the integrated, resultant intensity or phase of the light that has travelled through the last micro modulator element 11A (that is at the other end of the semiconductor optical modulation device 1) and is being output out of the device 1 can be represented by a value that shows a sufficient modulation as compared with that which would be without the input of the high frequency electric signal.

In addition, by using the semiconductor optical modulation device according to the present invention as a phase modulator part of a Mach-Zehnder interference system, a Mach-Zehnder optical modulator can be provided as a whole accomplishment by such devices.

Next, the reason why the reflection (of the high frequency electric signals) toward the input side (i.e., the drive circuit side) reflected by the semiconductor optical modulator can be reduced by the semiconductor optical modulation device complying with the device structure of the present invention is described below.

Figure 7:
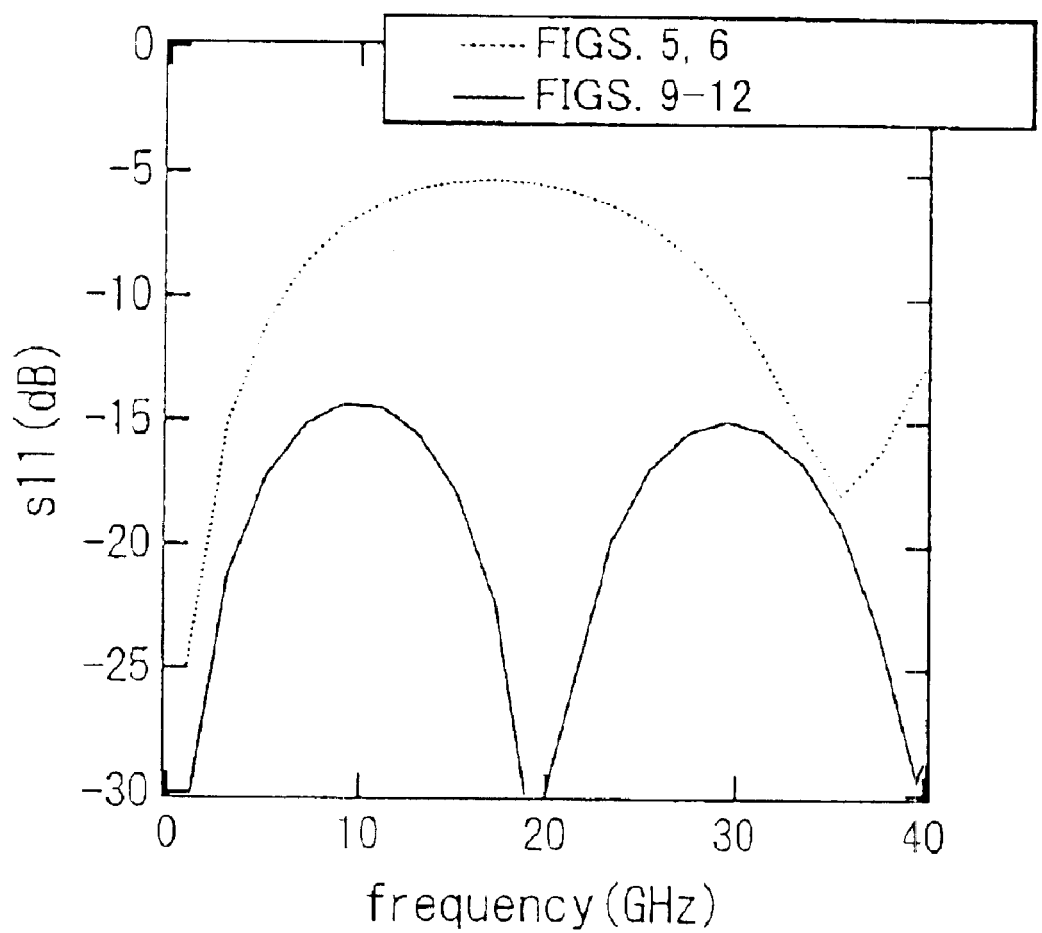
FIG. 7 is a graphic representation of s11 reflection characteristics in solid line obtained for a semiconductor optical modulation device (phase modulation device) 100 according to the present invention as a result obtained by a simulation using a three dimensional finite element method, as compared with s11 reflection characteristics in dotted line obtained by another simulation using the three dimensional finite element method, about the conventional traveling wave electrode type semiconductor optical modulator 1130 shown in FIGS. 5 and 6.

When high frequency electric signals are input into the semiconductor optical modulation device of the present invention, its resulting s11 reflection characteristics appear as shown in solid lines in FIG. 7. Here, it should be noted that the s11 reflection characteristics shown in FIG. 7 are a result obtained by a simulation using a three-dimensional finite element method based on a semiconductor optical modulation device shown in FIGS. 9 through 12 illustrating the first embodiment of the present invention as described below.

Now, the schematic structure of the semiconductor optical modulation device that will later be further illustrated in the first embodiment is described.

As shown in FIGS. 9 through 12, the semiconductor optical modulation device that will be exemplified in the first embodiment is formed on an InP substrate 101, wherein the entire InP substrate element 101 has electrical insulating properties. Further, in order to allow a large absorption coefficient gradient or a large refractive index gradient, an i-MQW optical waveguide core layer 103b is formed by InGaAsP multiple quantum well (MQW) structures that are lattice-matching with the InP substrate. Further, in contrast to the i-InP layer 1143a located under the i-InGaAsP optical waveguide core layer 1143b of the conventional modulator shown in FIG. 6, an i-InP layer 103a is provided under the i-MQW optical waveguide core layer 103b. The i-InP layer 103a is formed on an electrically-conductive-semiconductor n-InP cladding layer 102 that is formed on the insulating InP substrate 101.

Over the i-MQW optical waveguide core layer 103b in each micro optical modulator element 100A, there is provided a p-InP cladding layer 105a and a p-InGa-As contact layer 105b that are electrically conductive. In contrast, over the i-MQW optical waveguide core layer 103b in each gap region 100B, there is provided SI-InP layers 104 and 106 that are all semi-insulating.

Within each micro optical modulator element 100A, an Au-plated-metal signal electrode 108 is formed as an upper portion over the p-InGaAs contact layer 105b that constitutes an uppermost portion of a mesa. As a result, an ohmic contact is formed between the metal electrode 108 and the semiconductor p-InGaAs contact layer 105b. Further, in each gap region 100B, the Au-plated electrode 108 forms an air bridge, which electrically connects the two micro optical modulator elements 100A that are adjacent to each other and located on either side of the gap region 100B respectively.

Figure 9:
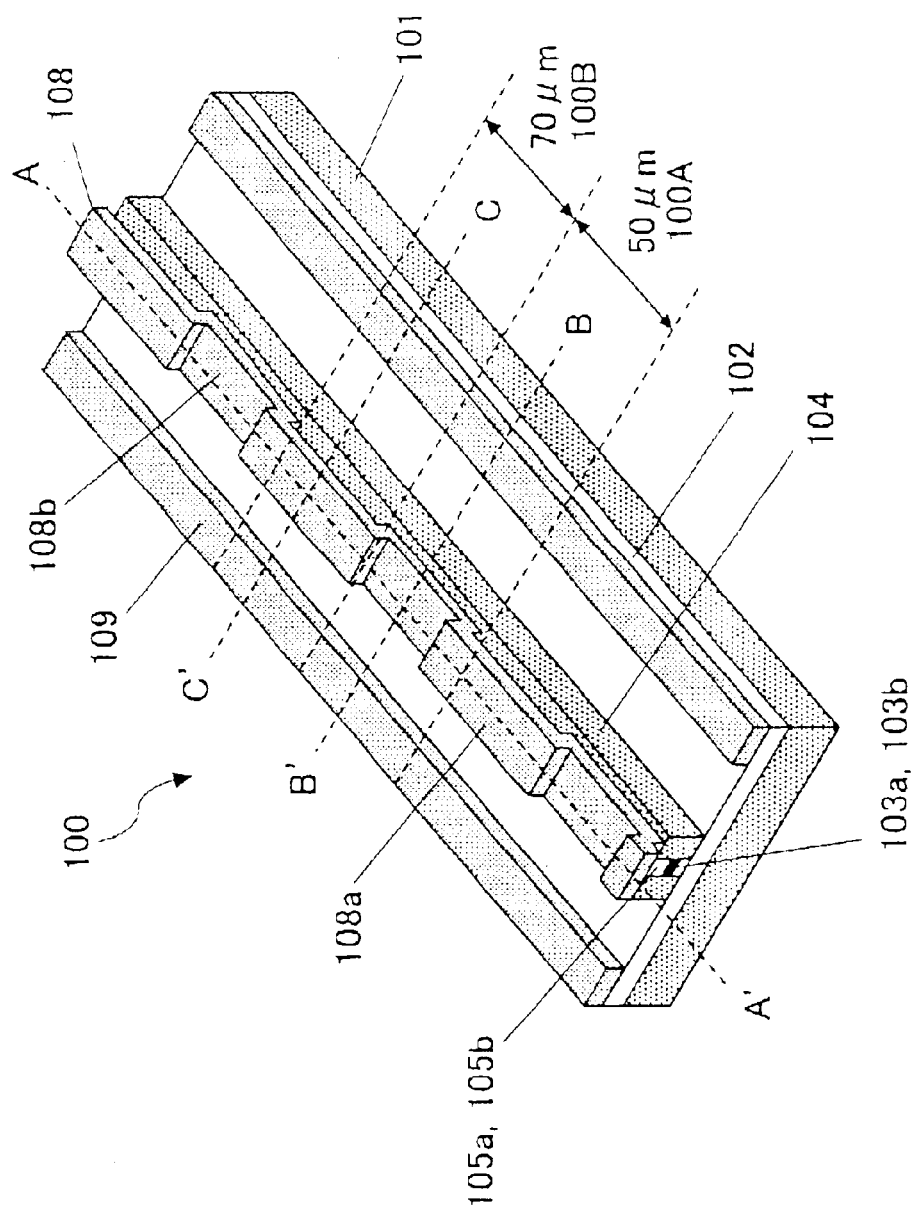
FIG. 9 is a perspective view showing a detailed structure of the semiconductor optical modulation device (phase modulation device) 100 shown in FIG. 7 according to the first embodiment of the present invention.

As for Au-plated-metal ground electrodes 109, the electrodes 109 are formed by Au plating on the n-InP cladding layer 102. Each of the electrodes 109 is located alongside the mesa and extends through the micro optical modulator elements 100A and the gap regions 100B as shown in FIG. 9.

With the device structure as stated above, the electric field within each gap region 100B exists in an almost uniform manner between the Au-plated-metal electrode air bridge 108a (upper portion of the device) and the n-InP cladding layer 102 under the i-InP layer 103a, which is undoped. Therefore, the capacitance of the gap region 100B is small.

Referring to FIG. 7, which shows that the S11 values of the present invention indicated in solid lines are under 14 dB across the frequency range of 0 through 40 GHz, it should be noted that the signal reflection toward the drive circuit from the semiconductor optical modulation device is sufficiently reduced according to the present invention.

This advantageous reduction is clearly seen when compared with the s11 values (shown in a dotted line in FIG. 7) of the traveling-wave electrode type conventional structure. One of ordinary skill in the art would clearly understand that the present invention provides a great deal of improvement as shown in FIG. 7.

This is because the feature that the small-capacitance gap regions are provided between the respective micro optical modulator elements (whose capacitance per unit length is relatively large) makes it possible to reduce the impedance of the overall device, in contrast to a conventional semiconductor optical modulator whose device length is considerably long. Thus, in accordance with the present invention, a person of ordinary skill in the art would be able to easily adjust the input impedance of the semiconductor optical modulation device to a desirable value (for example, 50 ohms).

Next, the reason why the driving voltage of the semiconductor optical modulation device according to the present invention can be sufficiently reduced is described.

In the semiconductor optical modulation device according to the present invention, the change of phase or the change of intensity that takes place in the light while the light goes through each one micro optical modulator element 10A is very small. This is because the length of each micro optical modulator element 10A is small (for example, 50 micrometers, in the example of FIG. 10). On the other hand, the change of phase or the change of intensity that takes place in the light while the light goes through the overall device 1 is the total of the changes of phase or the changes of intensity that take place in the light while the light goes through all of the plurality of micro optical modulator elements 10A.

Also, in the semiconductor optical modulation device according to the present invention, since the impedance of the overall device 1 can be designed to a desired value, there is not the reflection problem that takes place in conventional devices and causes a significant amount of reflection of the high frequency electric signals that were being input. It should be noted that this is true even when the overall device is long, in contrast to conventional semiconductor optical modulation devices.

Therefore, according to the present invention, a sufficient number of micro optical modulator elements 10A are employed in the overall device 1 (making the device long but without the reflection problem) so that a sufficient amount of phase change or intensity change between input light and output light is obtained when the input light goes through and is output from the device 1. As a result, in the semiconductor optical modulation device of the present invention, there is no need to increase the driving voltage as conventional devices do in order to achieve sufficient modulation. In other words, driving voltage in a semiconductor optical modulation device can be sufficiently reduced according to the present invention.

In the following descriptions, each embodiment is mainly discussed with one type of micro optical modulator element and one type of gap region, however, the present invention is not necessarily limited to such examples. It is also possible to employ a plurality of types of micro optical modulator elements and a plurality of types of gap regions in one semiconductor optical modulation device and such micro optical modulator elements and gap regions may be set in array on the light axis of the device.

Next, descriptions will be given of first through ninth preferred embodiments of the present invention.

1. First Embodiment

Now, the first embodiment of a preferred embodiment of the present invention is described in detail with reference to drawings (FIGS. 9 through 12 for the device structure and FIGS. 13 through 18 for the manufacturing method of the device). In this example, a semiconductor optical modulation device provided according to the present invention is configured and referred to as a phase modulation device.

Device Structure

Referring to FIG. 9, a phase modulation device 100 includes an electrically-high-resistance or insulating InP substrate 101 made of InP-based semiconductor material. On the insulating InP substrate 101, there is provided an n-InP cladding layer 102 that has electric conductivity improved by doping n-type element such as Se, Si, etc.

The phase modulation device 100 has a structure having micro optical modulator elements 100A and gap regions 100B alternately arrayed along the optical axis, as seen from the above descriptions. The phase modulation device 100 exemplified in this embodiment is made up of ten micro optical modulator elements 100A and ten gap regions 100B, with each micro modulator element and gap region being arrayed alternately and serially. However, in FIG. 9, etc., only three of such micro optical modulator elements 100A and only three of such ten gap regions 100B are shown due to space limitations in the drawing. As will be appreciated by one of ordinary skill in the art, in the present invention, the input end and the output end for the light and the electric signals of the semiconductor optical modulation device (i.e., the phase modulation device) may respectively be constituted by whichever of a micro optical modulator element and a gap region.

Further, each adjacent two of the ten micro optical modulator elements 100A of the device 100, which sandwich a gap region 100B, are electrically connected via a corresponding Au-plated electrode (air bridge) 108. In this embodiment, each portion 108a of the Au-plated electrode 108 formed above the gap region 100B is formed like a bridge (an air bridge 108a) in such a manner that the Au-plated electrode 108 does not touch the device body in the gap region 100B. Therefore, the capacitance in the gap region 100B is reduced. Thus, the Au-plated electrode 108 has a generally rectangular shape. Au-plated signal electrode portions 108b of the electrode 108 are physically contact the device body in the regions of the micro optical modulator elements 100A. Au-plated air bridge electrode portions 108a of the electrode 108 are spaced apart from the device body in the gap regions 100B.

In this embodiment, the width and thickness of the Au-plated electrode 108 in the gap region 100B are the same as those of the Au-plated electrode 108 in the micro optical modulator elements 100A. However, the present invention is not necessarily limited in such a manner. For example, the sectional area (i.e., width and/or thickness) of each Au-plated air bridge electrode portion 108a may be configured to become smaller than that of each Au-plated signal electrode portion 108b. This further helps achieve the desired value of the input impedance of the overall device.

Further, in the phase modulation device 100, there is provided an i-MQW optical waveguide core layer 103b formed between the Au-plated electrode 108 and the n-InP cladding layer 102. On each side of the i-MQW optical waveguide core layer 103b there is provided a high-resistance SI-InP layer 104 that contacts the Au-plated signal electrode portions 108b in the micro optical modulator elements 100A. More specifically, in each micro optical modulator element 100A, the Au-plated signal electrode portion 108b is formed in such a manner that it covers a p-InGaAs contact layer 105b (formed above the core layer 103b) and the SI-InP layers 104 formed on both sides of this layer.

Further, Au-plated ground electrodes 109 are formed along both sides of a mesa. The mesa is defined by the SI-InP layers 104 and the region between these layers 104. The Au-plated ground electrodes 109 and the mesa are spaced apart from each other, having a predetermined clearance between the ground electrodes 109 and the mesa. Ohmic contacts are between the n-InP cladding layer 102 and the ground electrodes 109.

Next, the layered structures of the micro optical modulator element 100A and the gap regions 100B of the phase modulation device 100 shown in FIG. 9 are described in detail with reference to FIGS. 10 through 12, which show the sectional structures of the phase modulation device 100 cut along respective planes indicated by broken lines A–A', B–B' and C–C' in FIG. 9.

Figure 10:
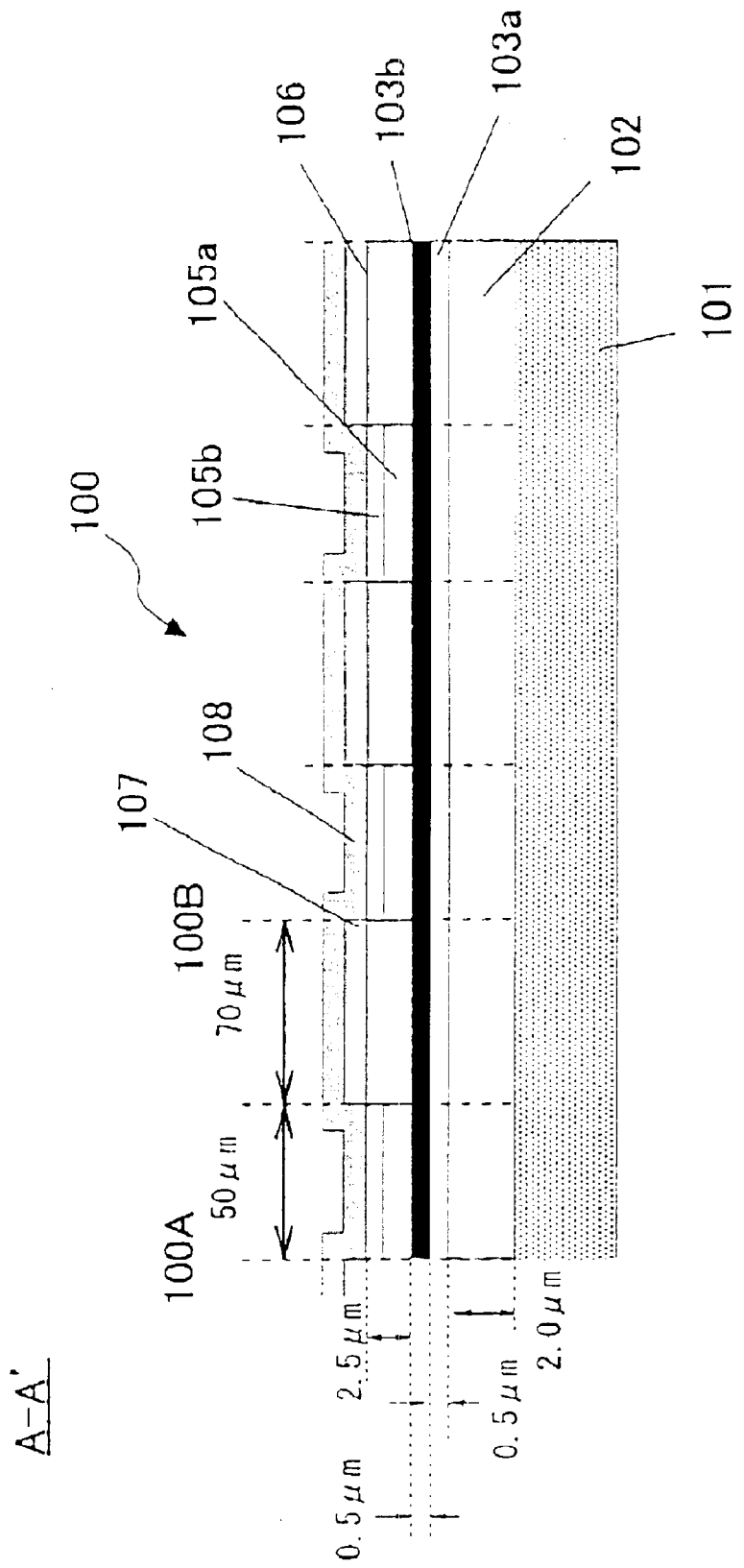
FIG. 10 is a section view showing a layered structure of the phase modulation device shown in FIG. 9, taken along the plane A–A'.

Thus, FIG. 10 shows the sectional structure of layers constituting the phase modulation device 100 cut along the A–A' plane of FIG. 9. The A–A' plane is parallel to the longitudinal axis of the i-MQW optical waveguide core layer 103b and is perpendicular to the insulating InP substrate 101.

Referring to FIG. 10, the micro optical modulator elements 100A and the gap regions 100B are arrayed alternately along the optical axis of the i-MQW optical waveguide core layer 103b. Each Au-plated electrode 108 has the air bridge shape above each gap region 100B, thereby defining a space 107 between the air bridge and the mesa. Further, in this embodiment, the thickness of the Au-plated electrode 108 is uniform in the gap regions 100B and in the micro optical modulator elements 100A.

Further, in this example, the length of each micro optical modulator element 100A taken along the optical axis is 50 micrometers, and that of each gap region 100B is 70 micrometers. In principle, the length of each micro optical modulator element 100A is designed based on a wavelength of high frequency electrical signals transmitted in the optical waveguide. In this example, the length of each micro optical modulator element 100A is preferably equal to or less than one fourth of the wavelength. Further, in principle, the length of each gap region 100B is designed based on the overall length of the device 100, the length of each micro optical modulator element 100A, the desired capacitance of each gap region 100B, for example.

In this embodiment, the i-MQW optical waveguide core layer 103b has a MQW layer whose thickness is 0.5 micrometers. More specifically, this MQW layer is made up of InGaAsP well layers (wherein thickness per well layer is 10 nm) and undoped-InP barrier layers (wherein thickness per barrier layer is 10 nm). In this embodiment, the i-MQW optical waveguide core layer 103b includes 25 InGaAsP well layers in total.

Further, a 0.5-micrometer-thick i-InP layer 103a is formed under the core layer 103b and, more specifically, between the core layer 103b and the n-InP cladding layer 102. The i-InP layer 103a is provided to prevent the capacitance per unit length of the micro optical modulator elements 100A from becoming too large.

The above described core layer 103b, i-InP layer 103a, and n-InP cladding layer 102 are formed uniformly across the micro optical modulator elements 100A and the gap regions 100B.

Further, in each micro optical modulator element 100A, there is provided a p-InP cladding layer 105a together with the p-InGaAs contact layer 105b. They are formed above the core layer 103b and, more specifically, between the core layer 103b and the corresponding Au-plated signal electrode portion 108b. On the other hand, in each gap region 100B there is provided a SI-InP layer 106 together with the space 107. They are formed above the core layer 103b and, more specifically, between the core layer 103b and the corresponding Au-plated air bridge electrode portion 108a. In this embodiment, the SI-InP layers 106 are integral with the aforementioned SI-InP layer 104 formed on both sides of the core layer 103b (the layer 104 is formed after the layers 106 are formed, as will be described later).

Such a semiconductor optical modulation device is advantageous because the reflection of high frequency electric signals from the device can be reduced and the driving voltage can be reduced, and it is advantageous specifically because the metal wiring formed over the mesa can be easily formed.

Each Au-plated air bridge electrode portion 108a and corresponding SI-InP layer 106 are spaced apart by the space 107, as shown in FIG. 10. In other words, each air bridge portion 108a is kept from touching the SI-InP layers 106. Each space 107 may be filled with air. Alternatively, it may be filled with a predetermined gas. The space 107 can be a vacuum space.

In such a device, the capacitance of the second optical modulation element (the gap region 100B) can be further reduced. Therefore, the input impedance of the entire device can be more easily matched to the impedance of an external circuit.

Next, the layered structures of the micro optical modulator element 100A and the gap regions 100B are described in further detail with reference to FIG. 11 (B–B' section) and FIG. 12 (C–C' section).

Figure 11:
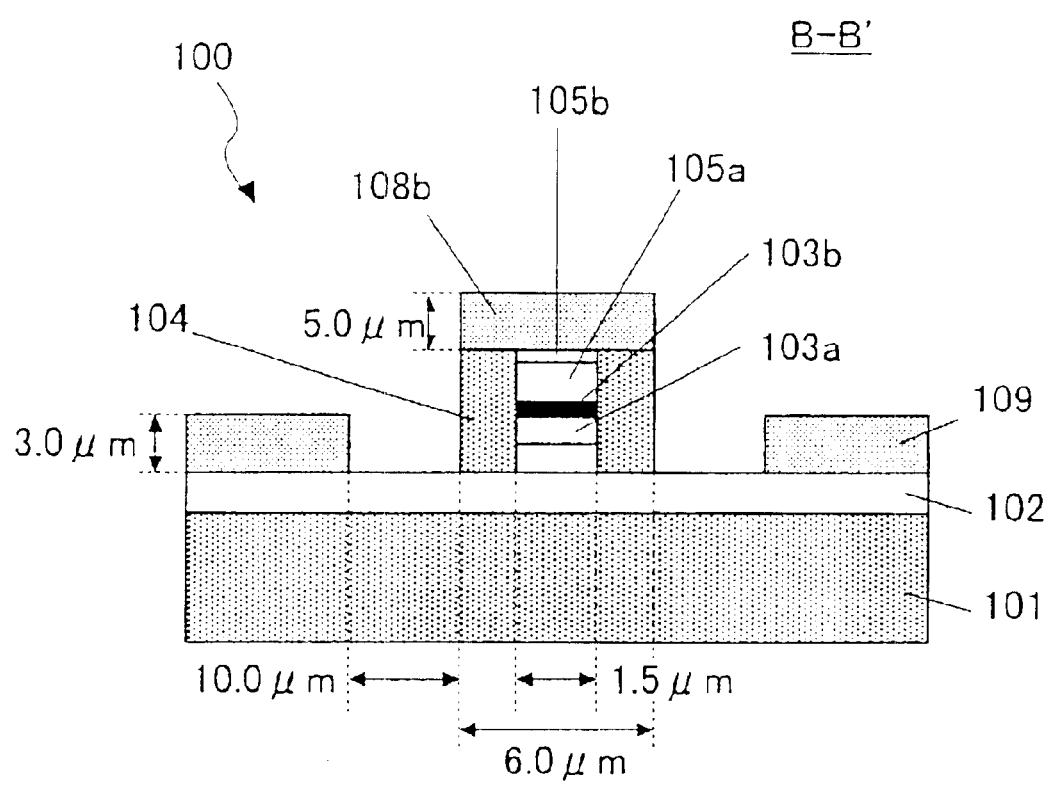
FIG. 11 is a section view showing a layered structure of the phase modulation device shown in FIG. 9, taken along the plane B–B'.

As is shown in FIG. 11, which illustrates a section of a micro optical modulator element 100A, the n-InP cladding layer 102 is formed on the insulating InP substrate 101. The n-InP cladding layer 102 has a convex portion underneath the i-InP layer 103a (that is under the core layer 103b). In this embodiment, the width of the core layer 103b and the i-InP layer 103a is 1.5 micrometers. Therefore, the convex portion of the n-InP cladding layer 102 is also 1.5 micrometers wide. The thickness of the convex portion of the n-InP cladding layer 102 is 2.0 micrometers, while the rest of the n-InP cladding layer 102 is 1.5 micrometers thick.

The SI-InP layers 104 are formed on both sides of the core layer 103b, the i-InP layer 103a and the convex portion of the n-InP cladding layer 102. Each SI-InP layer 104 is 4.0 micrometers high. Further, on the top face of the core layer 103b, there is a p-InP cladding layer 105a, which is 2.0 micrometers thick. On the cladding layer 105a, there is a p-InGaAs contact layer 105b, which is 0.5 micrometers thick. Both the layers 105a and 105b are within a region sandwiched with the two SI-InP layers 104 in such a manner that the aforementioned mesa is formed, wherein this mesa has a flat top face defined by the top faces of the layer 105b and the two SI-InP layers 104 as shown in FIG. 11. In this embodiment, the widths of the respective SI-InP layers 104 are designed appropriately so that the mesa becomes 6.0 micrometers wide.

Further, on the top face of the mesa, there is the Au-plated signal electrode portion 108b, which is 5.0 micrometers thick. The Au-plated signal electrode portion 108b has ohmic contact with the p-InGaAs contact layer 105b.

Further, the aforementioned ground electrodes 109, which are 3.0 micrometers thick and formed on the n-InP cladding layer 102, are spaced apart from the mesa by 10.0 micrometers.

More specifically, the doping concentrations of the p-InP cladding layer 105a, the p-InGaAs contact layer 105b and the n-InP cladding layer 102 are $1.5 \times 10^{18}$, $2.0 \times 10^{19}$ and $1.0 \times 10^{18}$ cm$^{-3}$ (per cubic centimeter) respectively. These concentrations are relatively high, which provides these layers with relatively high conductivities.

With this configuration, when an electric potential difference is applied between the Au-plated electrode 108 and the Au-plated ground electrodes 109, a large proportion of the resulting electric field is concentrated into the i-MQW core layer 103b (which forms the core layer of the optical waveguide in the micro optical modulator elements 100A) and the i-InP layer 103a right under the layer 103b. This is because the i-MQW core layer 103b and the i-InP layer 103a are nearly insulators while the n-InP cladding layer 102 can be regarded as an electric conductor. As a result, in each micro optical modulator element 100A, the electric field takes place in such a manner that the i-MQW optical waveguide core layer 103b and the i-InP layer 103a has an uniformly distributed electric field in themselves.

Figure 12:
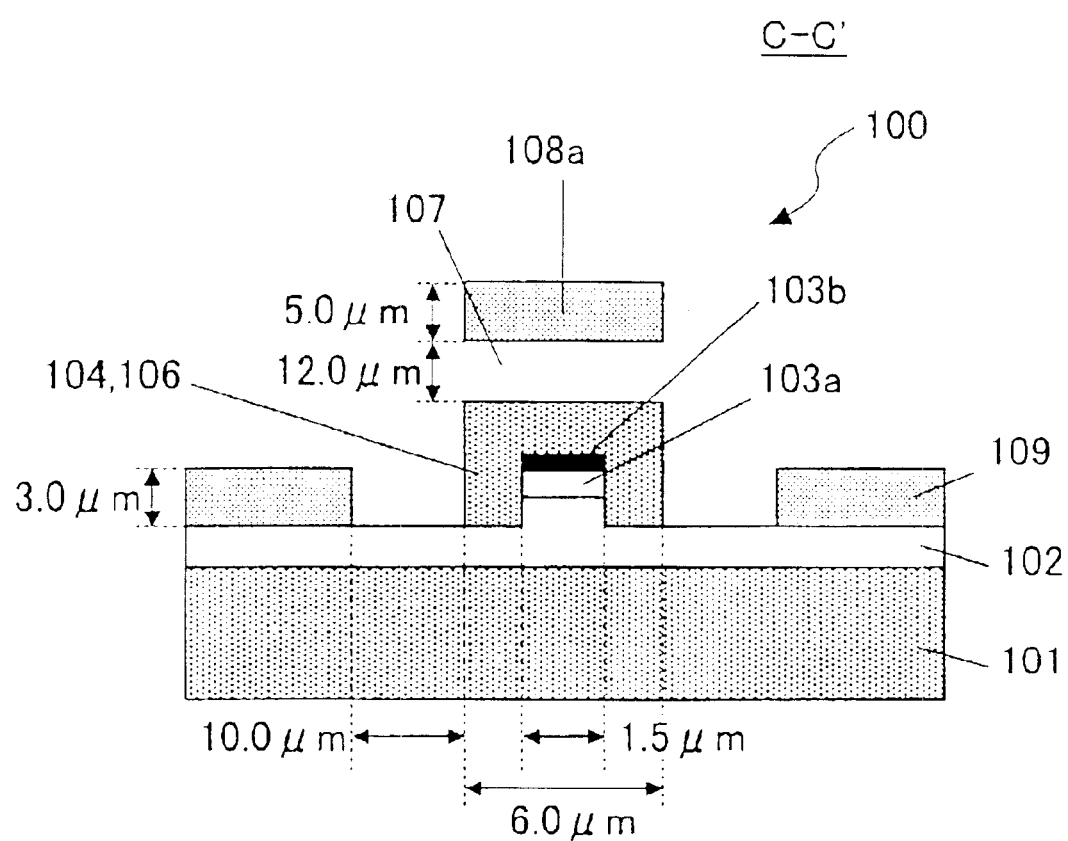
FIG. 12 is a section view showing a layered structure of the phase modulation device shown in FIG. 9, taken along the plane C–C'.

Next, the layered structure of the gap region 100B shown in FIG. 12, which is a C–C' section view of this embodiment, is described. In FIG. 12, the insulating InP substrate 101, the n-InP cladding layer 102, the i-InP layer 103a, the i-MQW optical waveguide core layer 103b and the Au-plated ground electrodes 109 are basically the same as shown in FIG. 11.

However, in the mesa portion of FIG. 12, the i-InP layer 103a, the core layer 103b and the aforementioned convex portion of the n-InP cladding layer 102 are surrounded with the SI-InP layers 104 and 106. The SI-InP layer 106 formed on the top face of the core layer 103b is 2.5 micrometers in thickness.

This formation of the insulating SI-InP layer 106 that is between the Au-plated air bridge electrode 108a and the n-InP cladding layer 102, and also between the air bridge electrode 108a and each Au-plated ground electrode 109 makes the gap region's electric field (that takes place when the electric potential difference is applied between the electrode 108 and the ground 109) weaker (as compared with the electric field in the micro optical modulator element 10A).

Further, as shown in FIG. 12 that the mesa and the Au-plated air bridge electrode 108a are spaced apart from each other with the 12.0-micrometers-height space 107.

With this configuration, when the potential difference is applied between the Au plated electrode 108 and the Au plated ground 109, the resulting electric field is distributed in a generally uniform manner at an extended zone that is defined between the air bridge electrode 108a and the n-InP cladding layer 102 (which is below the i-InP layer 103a), and between the air bridge electrode portion 108a and the ground electrodes 109. Therefore, the resulting electric field in the gap region 100B is weaker than in the micro optical modulator element 100A.

According to the above described device structure of this embodiment, the distance from each ground electrode 109 to the signal electrode (108a) in each gap region 100B is longer than the distance from each ground electrode 109 to the signal electrode (108b) in each micro optical modulator element 100A (in short, the electrodes' ground-to-signal distance differs between the gap region 100B and the micro optical modulator element 100A). This provides the device with smaller capacitance in the gap regions 100B than in the micro optical modulator elements 100A. Further, such small designed capacitance in the gap regions 100B can be reflected in the impedance design of the entire device in order to provide a phase modulation device with improved impedance value.

Manufacturing Process

Next, a manufacturing process of the phase modulation device 100 in accordance with this embodiment is described step by step in detail with reference to FIGS. 13 through 18 and then FIGS. 9 through 12, respectively.

Figure 13:
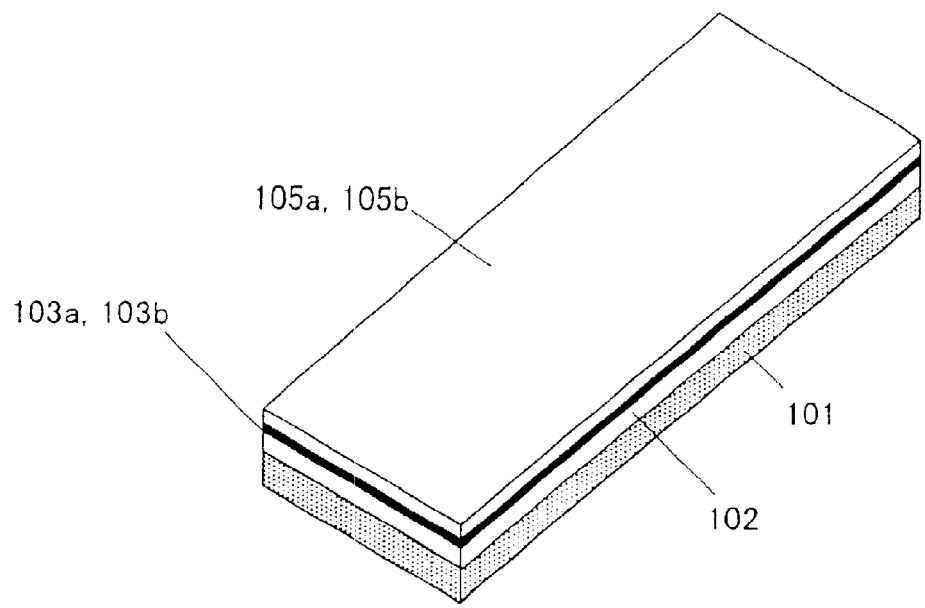
FIG. 13 is a schematic perspective view in explanation for some manufacturing steps for manufacturing the phase modulation device shown in FIG. 9.

Referring to FIG. 13, first, the aforementioned high-resistance insulating InP substrate 101 is prepared. Then, there are steps of forming a n-type InP layer (for the n-InP cladding layer 102), an undoped InP layer (for the i-InP layer 103a), an undoped multiple quantum well layer (for the i-MQW optical waveguide core layer 103b), a p-type InP layer (for the p-InP cladding layer 105a) and a p-type InGaAs layer (for the p-InGaAs contact layer 105b) in this order on this substrate 101 by using appropriate technologies including MOVPE (Metal Organic Vapor Phase Epitaxial). As a result, a wafer having a layered structure as shown in FIG. 13 is formed.

In the above steps, the thicknesses of the n-InP cladding layer 102, the i-InP layer 103a, the i-MQW optical waveguide core layer 103b, the p-InP cladding layer 105a and the p-InGaAs contact layer 105b are 2.0 micrometers, 0.5 micrometers, 0.5 micrometers, 2.0 micrometers and 0.5 micrometers respectively.

The doping concentrations of the n-InP cladding layer 102, the p-InP cladding layer 105a and the p-InGaAs contact layer 105b are $1.0 \times 10^{18}$, $1.5 \times 10^{18}$ and $2.0 \times 10^{19}/cm^3$ (per cubic centimeter) respectively. Doping materials employed to be doped in n-type semiconductors in this embodiment are n-type elements (as impurity atoms) such as Se, Si, for example, and, materials employed to be doped in p-type semiconductors in this embodiment are p-type elements (as impurity atoms) such as Zn, Mg, for example.

Figure 14:
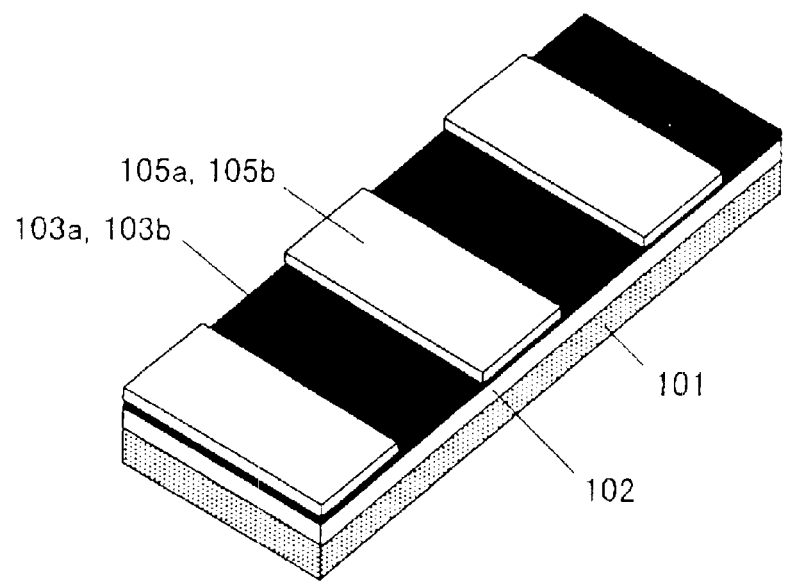
FIG. 14 is a schematic perspective view in explanation for further manufacturing steps for manufacturing the phase modulation device shown in FIG. 9.

Next, there are steps for acquiring a structure that is shown in FIG. 14. In these steps, first, a $SiO_2$ layer is formed by CVD (Chemical Vapor Deposition) on the surface of the wafer formed as stated above (i.e., on the p-InGaAs contact layer 105b as shown in FIG. 13) and a photoresist layer is formed. Thereafter, a photolithographic mask layer is formed according to a predetermined mask pattern by a photolithography (lithographic method used with the photoresist layer).

Next, the wafer (on which the mask layer with the predetermined mask pattern has been formed as stated above) is subjected to a dry etching step using plasma generated in a gas mixture of $SiCl_4$ and Ar. It should be noted that this etching is performed to uncover the surface of the i-MQW core layer 103b (only in the areas not covered by the mask) and no deeper than that. As a result, the wafer is formed into a layered structure as shown in FIG. 14.

Figure 15:
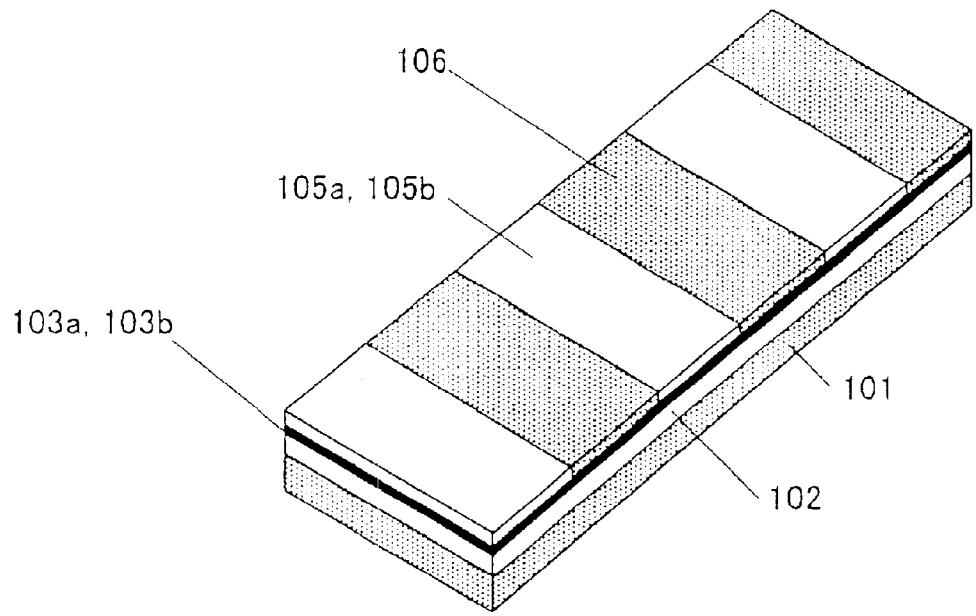
FIG. 15 is a schematic perspective view in explanation for still further manufacturing steps for manufacturing the phase modulation device shown in FIG. 9.

Next, there are steps for acquiring a structure that is shown in FIG. 15. In these steps, the high-resistance SIInP layer 106 is formed by MOVPE in the above stated etched areas (where the p-InGaAs contact layer 105b and the p-InP cladding layer 105a were removed and the i-MQW core layer 103b was uncovered by the above etching step). In these steps, the SI-InP layer 106 is grown as high as the top surface of the non-etched p-InGaAs contact layer 105b remaining in the non-etched areas, thereby forming the wafer into a layered structure as shown in FIG. 15.

In these steps, before growing the SI-InP layer 106, a mask layer of dielectric material such as $SiO_2$ is formed in order to allow the SI-InP layer 106 to grow in the etched areas only. This is making use of the principle of MOVPE that the semiconductor growth does not take place on dielectric material layer formed on a semiconductor material. Further, after the SI-InP layer 106 is formed as above, the mask layer is removed by buffered hydrofluoric acid treatment.

In the obtained structure as shown in FIG. 15, the length of each non-etched area where the p-InP cladding layer 105a remains as taken along the optical axis is 50 micrometers. The length of each area where the SI-InP layer 106 is formed as taken along the optical axis is 70 micrometers.

Figure 16:
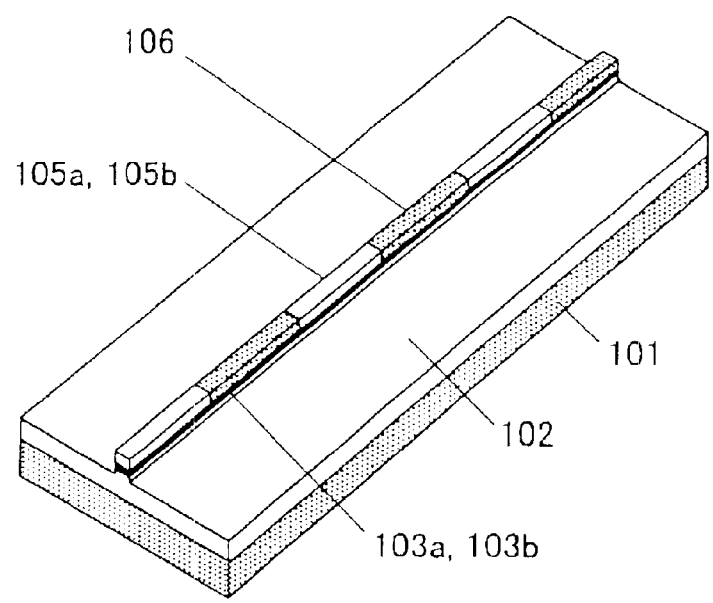
FIG. 16 is a schematic perspective view in explanation for manufacturing steps further to FIG. 15 for manufacturing the phase modulation device shown in FIG. 9.

Next, there are steps for acquiring a structure that is shown in FIG. 16. In these steps, a layer of photoresist that also employs $SiO_2$ is formed all over the wafer's top surface (made up of the top faces of the p-InP cladding layer 105a and the SI-InP layer 106 formed in FIG. 15). Then a mask layer with a predetermined mask pattern is formed in a photolithographic step.

Thereafter, the wafer that has the mask layer with the predetermined mask pattern is subjected to a dry etching step that uses a plasma generated in a gas mixture of $SiCl_4$ and Ar. In this way, the i-MQW optical waveguide core layer 103b (made from MQW), the i-InP layer 103a, the p-InP cladding layer 105a, the p-InGaAs contact layer 105b, the SI-InP layer 106 and the top surface of the n-InP cladding layer 102 are respectively treated in such a manner as to form a preliminary shape like a mesa.

The preliminary mesa is 1.5 micrometers wide and 4.0 micrometers in height. As a result, the wafer formed into a layered structure as shown in FIG. 16 is obtained.

Figure 17:
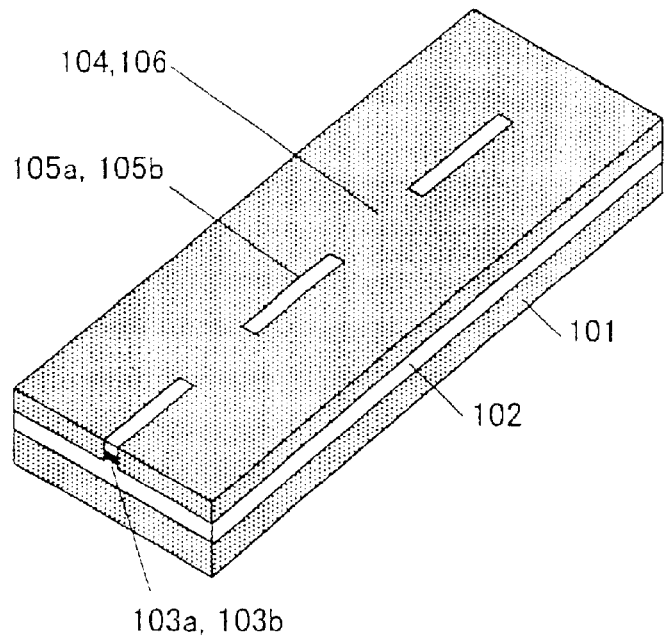
FIG. 17 is a schematic perspective view in explanation for manufacturing steps further to FIG. 16 for manufacturing the phase modulation device shown in FIG. 9.

Next, there are steps for acquiring a structure that is shown in FIG. 17. In these steps, the wafer that has the preliminary mesa is subjected to a crystal-growth process using MOVPE, which forms the high-resistance SI-InP layer 104 in areas other than those occupied with the preliminary mesa. The high-resistance SI-InP layer 104 is formed as high as the preliminary mesa. As a result, the wafer formed into a layered structure as shown in FIG. 17 is obtained.

In these steps, the SI-InP layer 104 is not formed on the top faces of the preliminary mesa because the aforementioned $SiO_2$ layer is present there. After the formation of the SI-InP layer 104 is completed as above, this mask layer on the mesa is then removed in the same manner as stated above.

Figure 18:
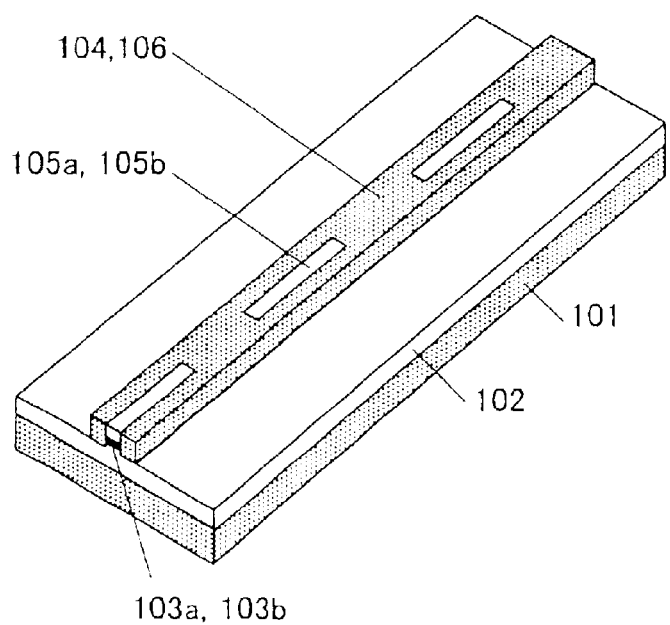
FIG. 18 is a schematic perspective view in explanation for manufacturing steps further to FIG. 17 for manufacturing the phase modulation device shown in FIG. 9.

Next, there are steps for acquiring a structure that is shown in FIG. 18. In these steps, first, a layer of photoresist that also employs $SiO_2$ is formed on the top faces of the preliminary mesa and the SI-InP layer 104. It is then subjected to a photolithographic patterning. In this way, a mask layer with a predetermined mask pattern is formed.

Thereafter, the wafer surface that has the mask layer with the predetermined mask pattern is subjected to a dry etching that uses a plasma generated in a gas mixture of $SiCl_4$ and Ar. As a result, the aforementioned mesa that is 6.0 micrometers wide and 4.0 micrometers high is formed, which is shown in FIG. 18. After the formation of the mesa completed in this way, the mask layer is then removed in the same manner as stated above.

In these steps, it should be noted that the SI-InP layer 104 is formed for the purpose of facilitating the later formation of the Au-plated electrode 108 on the core layer. Therefore, depending on the necessity of the formation of the Au-plated electrode 108, the step of forming the SI-InP layer 104 can be omitted.

Next, there are steps for acquiring a structure that is shown in FIGS. 9 through 12. In these steps, in order to form the Au-plated electrode 108 and the Au-plated ground electrodes 109, first, a layer of photoresist is formed on the surface of the mesa, which is subjected to a photolithographic patterning so as to form a mask layer with a predetermined mask pattern. The thickness of the mask layer (that is at least formed on the top face of the mesa) is 12.0 micrometers so that the clearance between the mesa and the Au-plated electrode (air bridge) in the gap region becomes 12.0 micrometers.

Thereafter, the wafer that has the mask layer with the predetermined mask pattern is subjected to Au-plating processes to form the Au-plated electrode 108 and the Au-plated ground electrodes 109. The resulting Au-plated electrode 108 is 5.0 micrometers thick and 6.0 micrometers wide. Each of the resulting Au-plated ground electrodes 109 is 3.0 micrometers thick, as shown in FIG. 12.

The formation of the electrodes is carried out in such a manner that the Au-plated signal electrode portion 108b and the p-InGaAs contact layer 105b are in contact with each other to have ohmic contact between them in the areas where the p-InGaAs contact layer 105b remains in the top face of the mesa (i.e., where to form the micro optical modulator elements 100A).

In this way, the Au-plated electrode 108 and the Au-plated ground electrodes 109 are formed and the mask layer is then removed, thereby forming the spaces 107 (shown in FIG. 10). Finally, the phase modulation device 100 as shown in FIGS. 9–12 is obtained.

How the Device Works

Now, how the phase modulation device 100 formed as above works is described with reference to FIG. 7.

In FIG. 7, the s11 reflection characteristics determined in the phase modulation device 100 of this embodiment are shown in solid lines. In contrast, the s11 reflection characteristics determined in a traveling-wave electrode type conventional semiconductor optical modulator (the modulator shown in FIG. 5) are shown in a dotted line in FIG. 7. S11 reflection characteristics are the characteristics that indicate the intensity ratio of a reflected electric signal and an output electric signal when an electric signal that is output at a port (say, "port 1") is then returned to the same port (port 1).

In the phase modulation device 100 of this embodiment, the total of the thicknesses of the i-MQW optical waveguide core layer 103b and the i-InP layer 103a is 1.0 micrometers, which is relatively small. Therefore, the refractive index gradients when the voltages are applied to the micro optical modulator devices are relatively large.

In contrast, in a conventional semiconductor optical modulation device having an uniform longitudinal-section structure, the total of the thicknesses of its i-MQW optical waveguide core layer 1103b and its i-InP layer 1103a is 1.0 micrometers (that is equal to that of this embodiment) for comparison purposes. The capacitance per unit length of the conventional semiconductor optical modulation device is quite large due to its uniform sectional structure. Thus, its input impedance is smaller than its desired value (in general, 50 ohms). As a result, since impedance matching with the input side cannot be achieved, the input high frequency electric signal is reflected toward the drive circuit side (i.e., the input side), thereby deteriorating the device characteristics.

This is apparent from the dotted line in FIG. 7, where the s11 reflection characteristics determined in the traveling-wave electrode type conventional semiconductor optical modulator show high values for the 0 GHz through 40 GHz high frequency electric signals, whose maximum value is as high as −5 dB, which is quite high.

In contrast, in the structure of the phase modulation device 100 of this embodiment, the gap elements 100B, which have small capacitance per unit length, are located between the plurality of micro optical modulator devices 100A. Due to this structure, the input impedance of the entire device can be easily matched with the input side's impedance. This is capable of reducing the reflection toward the drive circuit that produces the input high frequency electric signals.

This is also apparent from the solid lines in FIG. 7, where the s11 reflection characteristics values of the phase modulation device 100 of this embodiment for the 0 GHz through 40 GHz high frequency electric signals are not higher than −14 dB, which are significantly reduced values as compared with the conventional modulator. In short, the phase modulation device 100 of this embodiment shows improved reflection characteristics.

The s11 reflection characteristics shown in FIG. 7 are the ones determined by three-dimensional simulations such as a finite element method, a boundary element method, for example. The sizes and configurations numerically illustrated in this example were obtained by a structural optimization performed based on such simulations.

2. Second Embodiment

Now, a second embodiment of the present invention, as compared with the phase modulation device 100 of the first embodiment is described in detail with reference to FIG. 19.

Figure 19:
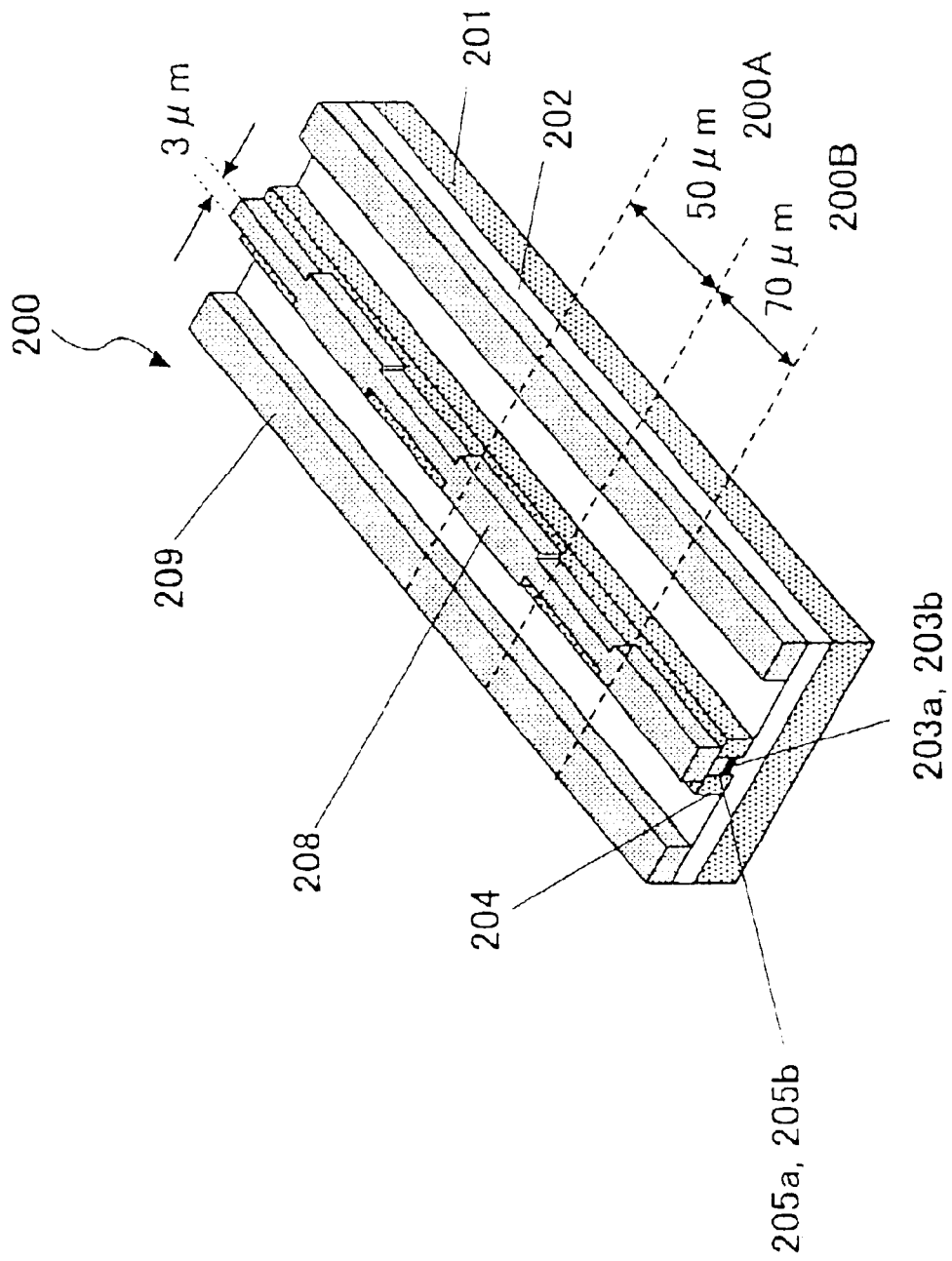
FIG. 19 is a perspective view showing a detailed structure of a phase modulation device 200 according to the second embodiment of the present invention.

FIG. 19 is a perspective view of a phase modulation device 200 of this embodiment.

Referring to FIG. 19, the phase modulation device 200 has an Au-plated electrode 208 on a mesa. The shape of the Au-plated electrode 208 is different from the Au-plated electrode 108 of the first embodiment. However, basically, the above described manufacturing steps performed prior to forming the Au-plated electrode 108 in the first embodiment together with the structures formed prior to forming the electrode 108 can be applied to the second embodiment prior to the formation of the Au-plated electrode 208.

In gap regions 200B of this embodiment, the Au-plated electrode 208 does not have the air bridge shape of the first embodiment but is in touch with the top face of the mesa, thereby facilitating the process of forming the Au-plated electrode 208.

This embodiment has a feature similar to the first embodiment in that there is no conductive semiconductor between the Au-plated electrode 208 and a top surface of an i-MQW optical waveguide core layer 203b in the gap regions 200B. Therefore, the capacitance in the gap regions 200B is smaller than that of micro optical modulator elements 200A.

As a result, the input impedance of the entire device of this embodiment is also capable of being easily matched with the impedance of the input side, thereby preventing the high frequency electric signals (that are being input into the device) from reflecting toward the drive circuit.

The Au-plated electrode 208 on the mesa in this embodiment is 6.0 micrometers wide in the micro optical modulator elements 200A and 3.0 micrometers wide in the gap regions 200B.

The semiconductor optical modulation device is advantageous because the reflection of high frequency electric signals from the device is reduced and the driving voltage is reduced, and it is advantageous specifically because of the capability of making the electric field produced by applying the voltage concentrate into the optical waveguide, which reduces the driving voltage further effectively and also reduces the device length.

3. Third Embodiment

Next, a third embodiment of the present invention, as compared with the phase modulation device 100 of the first embodiment is described in detail with reference to FIGS. 20 and 21.

Figure 20:
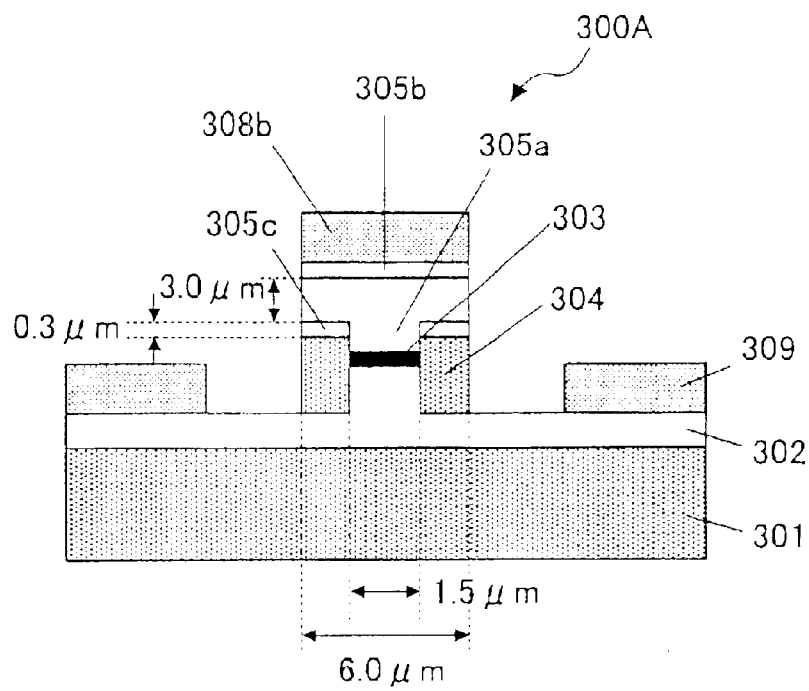
FIG. 20 is a section view showing a layered structure of a micro optical modulation device 300A in a phase modulation device 300 according to the third embodiment of the present invention.
Figure 21:
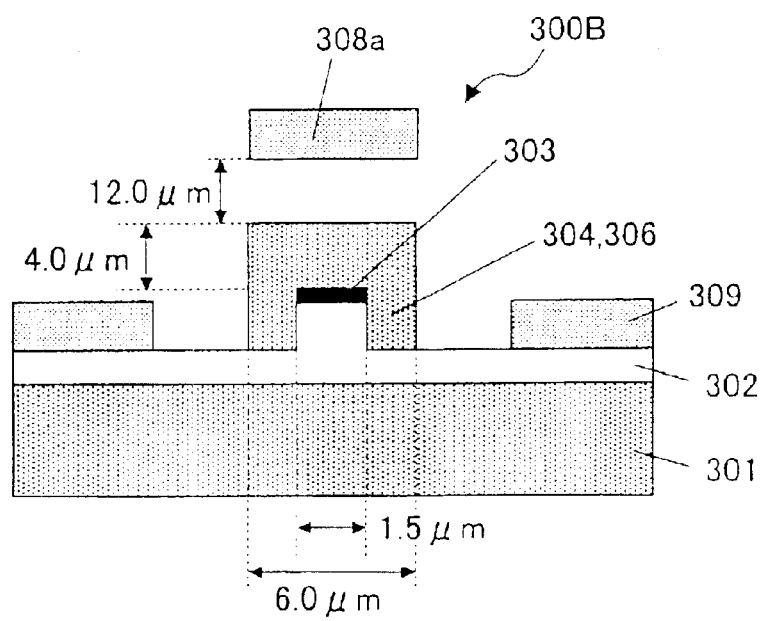
FIG. 21 is a section view showing a layered structure of a gap region 300B in the phase modulation device 300 of according to the third embodiment of the present invention.

FIG. 20 is a sectional view taken along a plane perpendicular to the optical axis of a micro optical modulator element 300A of a phase modulation device 300 of this embodiment. FIG. 21 is a sectional view taken along a plane perpendicular to the optical axis of a gap region 300B of the phase modulation device 300.

The phase modulation device 300 of this embodiment has a mesa whose shape is different from the mesa of the first embodiment. However, its structures other than the mesa shape and structure is basically the same as the first embodiment. Therefore, the entire phase modulation device 300 has a perspective view that is quite similar to FIG. 9.

Referring to FIG. 20, the micro optical modulator element 300A of the phase modulation device 300 has a layered structure wherein its difference as compared with the first embodiment is that a p-InGaAs contact layer 305b and a p-InP cladding layer 305a over an i-MQW optical waveguide core layer 303 are as wide as the mesa. As a result, the micro optical modulator element 300A of the phase modulation device 300 has a reduced electric resistance in its section. In addition, this leads to an easier formation of an Au-plated electrode (i.e., signal electrode portions 308b and air bridges 308a over the mesa).

Further, on the top face of a SI-InP layer 304 that forms the sidewalls of the mesa, there is provided a 0.3-micrometer-thick n-InP layer 305c. This prevents the electric field that takes place when the electric potential difference is applied between the Au-plated signal electrode 308b and the Au-plated ground electrodes 309 from being distributed through the surface area of the p-InP cladding layer 305a except a surface area that is in contact with the core layer 303. Thus, the resulting electric field is efficiently concentrated into the i-MQW optical waveguide core layer 303.

The gap region 300B according to this embodiment has a layered structure wherein its difference as compared with the gap region 100B of the first embodiment is that there is no i-InP layer provided under the i-MQW optical waveguide core layer 303, which is also true in the layered structure of the micro optical modulator element 300A.

4. Fourth Embodiment

Next, a fourth embodiment of the present invention, as compared with the phase modulation device 100 of the first embodiment is described in detail with reference to FIGS. 22 and 23.

Figure 22:
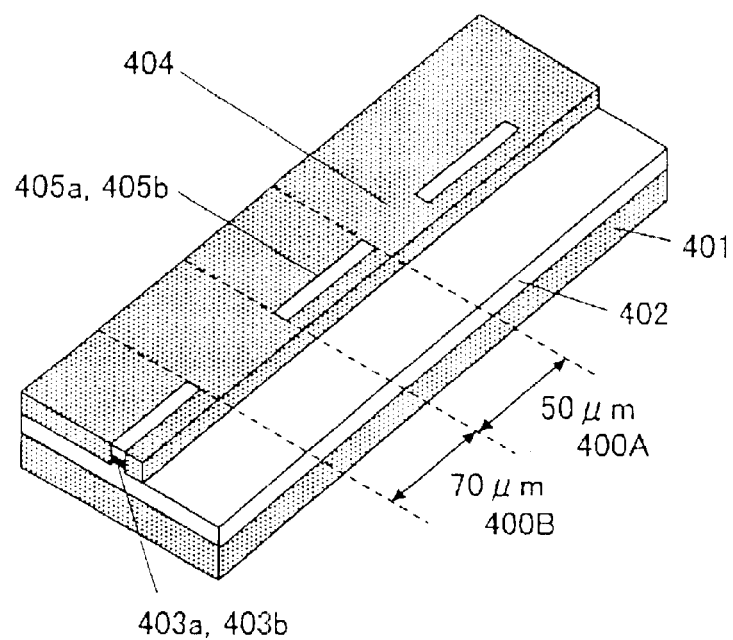
FIG. 22 is a perspective view showing a detailed structure of an uncompleted phase modulation device 400 (i.e., Au-plated electrodes 408 and 409 are not formed yet) according to the fourth embodiment of the present invention.
Figure 23:
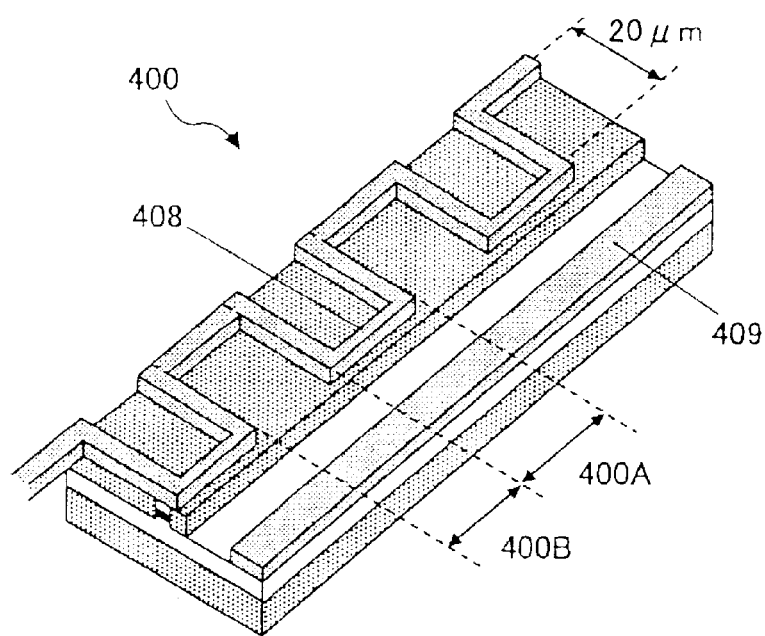
FIG. 23 is a perspective view showing a detailed structure of a completed phase modulation device 400 according to the fourth embodiment of the present invention.

FIG. 23 is a perspective view of a phase modulation device 400 of this embodiment. FIG. 22 is a perspective view showing an in-process device structure that is partway constructed toward completion of the phase modulation device 400 and is before formation of Au-plated electrodes 408 and 409.

Referring to FIGS. 22 and 23, the phase modulation device 400 of this embodiment is different from the phase modulation device 100 of the first embodiment in that there is provided an Au-plated ground electrode 409 that is in contact with a n-InP cladding layer 402 and the electrode 409 is provided along just one side of a mesa that is made up of an i-InP cladding layer 403a, an i-MQW optical waveguide core layer 403b, a p-InP cladding layer 405a and a p-InGaAs contact layer 405b. A large proportion of an n-InP cladding layer 402 at the other side of the mesa in this phase modulation device 400 is formed in a removed manner but is covered by a high-resistance SI-InP layer 404 formed as high as the top surface of the mesa instead.

This layered structure includes micro optical modulator element portions 400A wherein an Au-plated electrode 408 is formed above the p-InGaAs contact layer 405b in a manner that is basically similar to the first embodiment. On the other hand, the layered structure also includes gap regions 400B wherein the Au-plated electrode 408 is formed on the top face of the high-resistance SI-InP layer 404 in such a manner as to take a roundabout course that goes sideways relative to the mesa (i.e., goes away from the optical axis) and also goes away from the Au-plated ground electrode 409.

Thus, this embodiment keeps a great distance from the signal electrode 408 to the n-InP cladding layer 402 and the Au-plated ground electrode 409, thereby reducing the capacitance in the gap regions 400B. Consequently, according to the phase modulation device 400 of this embodiment, the input impedance of the device can be adjusted to a larger value.

In such a device, since the capacitance of the second optical modulation element (the gap region 400B) is reduced, the input impedance of the entire device can be easily matched to the impedance of an external circuit.

Other details of this embodiment can be understood as similar to the first embodiment.

5. Fifth Embodiment

Next, a fifth embodiment of the present invention, as compared with the phase modulation device 100 of the first embodiment is described in detail with reference to FIGS. 24 and 25.

Figure 24:
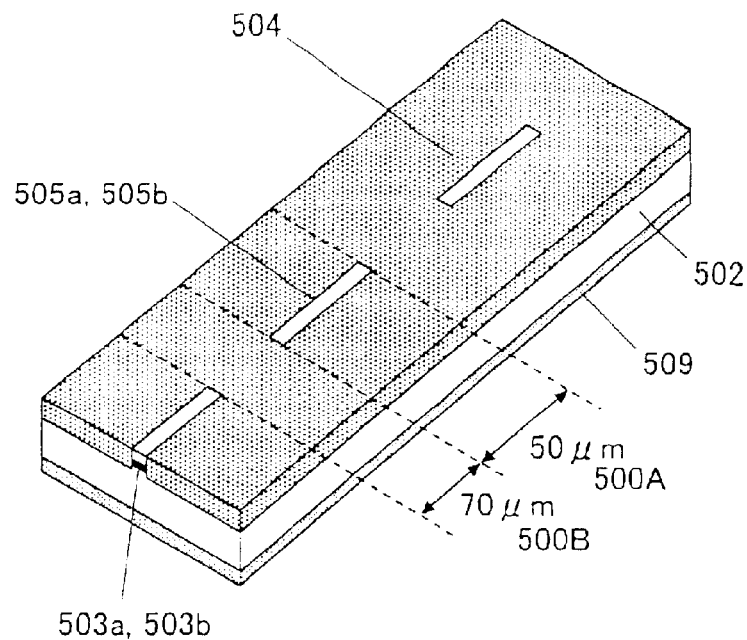
FIG. 24 is a perspective view showing a detailed structure of an uncompleted phase modulation device 500 (i.e., Au-plated electrode 508 is not formed yet) according to the fifth embodiment of the present invention.
Figure 25:
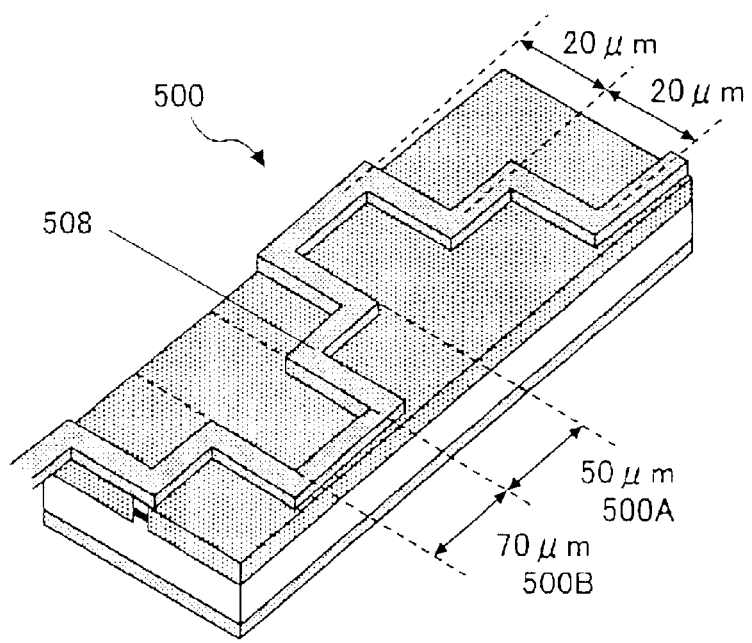
FIG. 25 is a perspective view showing a detailed structure of a completed phase modulation device 500 according to the fifth embodiment of the present invention.

FIG. 25 is a perspective view of a phase modulation device 500 of this embodiment. FIG. 24 is a perspective view showing an in-process device structure that is partway constructed toward completion of the phase modulation device 500 and is before formation of an Au-plated electrode 508.

Referring to FIGS. 24 and 25, the phase modulation device 500 of this embodiment employs an n-type InP substrate 502 whose underside surface (i.e., the other side of the i-MQW optical waveguide core layer 503b) is provided with an Au-plated ground electrode 509.

Further, the Au-plated electrode 508 is formed above a p-InGaAs contact layer 505b in the micro optical modulator element portions 500A of the phase modulation device 500. On the other hand, the phase modulation device 500 also includes gap regions 500B wherein the Au-plated electrode 508 is formed on the top face of the high-resistance SI-InP layer 504 in such a manner that it takes a roundabout course that goes sideways relative to a mesa that is made up of an i-InP layer 503a, an i-MQW optical waveguide core layer 503b, a p-InP cladding layer 505a and a p-InGaAs contact layer 505b.

More specifically, in this embodiment, the Au-plated electrode 508 takes roundabout courses whose directions alternate relative to the mesa (i.e., going in the opposite directions from the mesa when comparison is made between two consecutive gap regions). Thus, the adverse effect of the mutual inductance between the Au-plated portions in the gap regions can be reduced.

6. Sixth Embodiment

Next described is a sixth embodiment of the present invention, where a semiconductor laser is capable of being formed integrally on a semiconductor chip that has a phase modulator that is of the type illustrated in any of the above embodiments, thereby enabling manufacture of semiconductor chips and semiconductor lasers integrally formed therewith.

Figure 26:
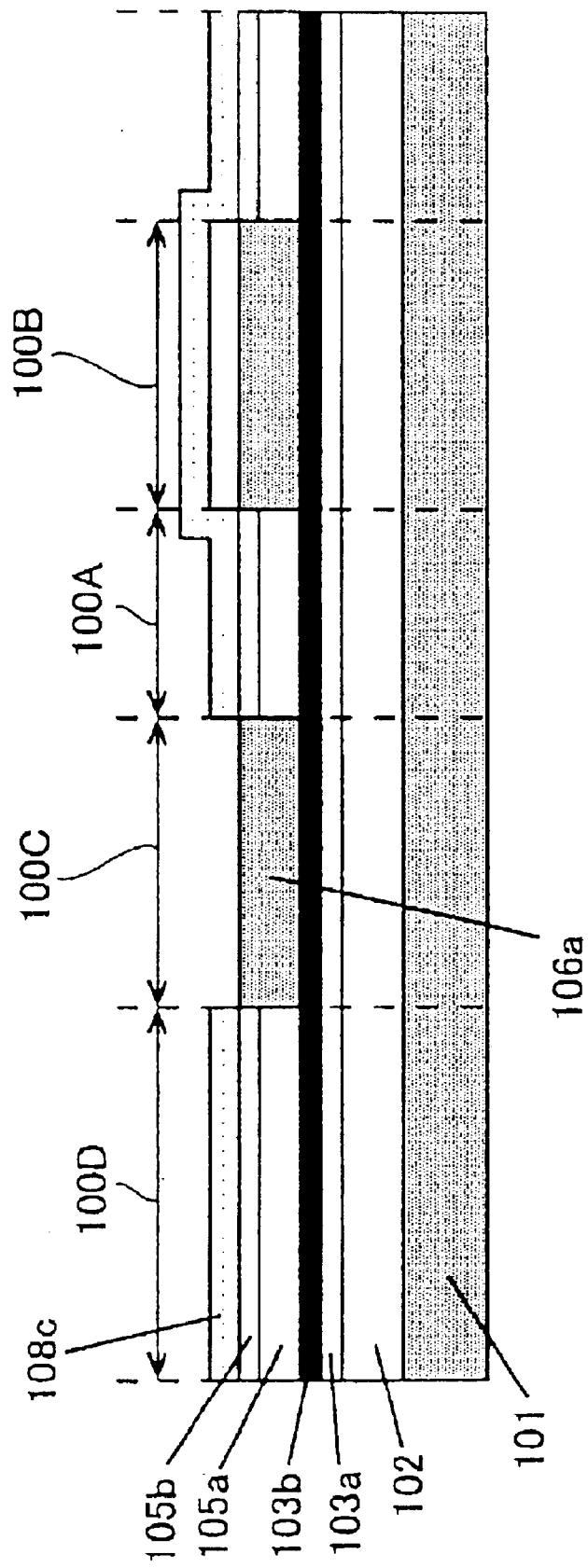
FIG. 26 is a section view showing a layered structure of an optical semiconductor device with a semiconductor laser according to the sixth embodiment of the present invention.

A layered structure in a section parallel to the optical axis of the semiconductor chip provided in this embodiment and perpendicular to a semiconductor substrate of the chip is shown in FIG. 26.

Referring to FIG. 26, a LD (Laser Diode) 100D is optically connected to the phase modulator 100 (that is made up of the micro optical modulator elements 100A and the gap regions 100B) via an isolation region 100C.

To be more specific about the isolation region 100C, there are the insulating InP substrate 101, the n-InP cladding layer 102, the i-InP layer 103a and the i-MQW optical waveguide core layer 103b formed in the same positions respectively relative to the direction seen from bottom to top, across the isolation region 100C between the LD 100D and the phase modulator 100. The structure of the MQW layer in the LD 100D is designed in such a manner that its oscillation wavelength becomes 1.55 micrometers.

Further, there is a laminated SI-InP layer 106a over the i-MQW optical waveguide core layer 103b in the isolation region 100C.

More specifically, a semi-insulating material layer (i.e., the SI-InP layer 106a) is formed on the top face of the i-MQW optical waveguide core layer 103b (which optically connects the LD 100D to the phase modulator 100), thereby isolating the LD 100D from the phase modulator 100 electrically in the optical semiconductor device of this embodiment.

Further, this embodiment may alternatively be represented by a variant in which there is one of or a combination of a semi-insulating material layer, a dielectric material layer, an air layer, and a vacuum layer, for example, under or both under and on the top face of the i-MQW optical waveguide core layer 103b, thereby electrically isolating the LD 100D from the phase modulator 100. Such a configuration (not shown in the figures) is an alternative to the above illustrated configuration of providing the semi-insulating material layer formed on the top face of the i-MQW optical waveguide core layer 103b as shown in FIG. 26.

Thus, according to this embodiment, it is possible to provide a semiconductor-laser-implemented optical semiconductor device which shows an improved interaction (i.e., basically less electric interaction) between the LD 100D and the semiconductor phase modulator 100 when electric signals are input into the LD 100D and/or the semiconductor phase modulator 100.

Likewise, there can be provided one chip device comprising a semiconductor laser integrally formed with any of the inventive semiconductor optical modulation devices according to the present invention.

7. Seventh Embodiment

Next described is a seventh embodiment of the present invention, including a configuration in which arms (for example, two arms) of the Mach-Zehnder optical modulator shown in FIG. 1 are respectively provided with phase modulators in accordance with the present invention as illustrated in the above embodiments, showing improved interaction between the phase modulators 100.

Figure 27:
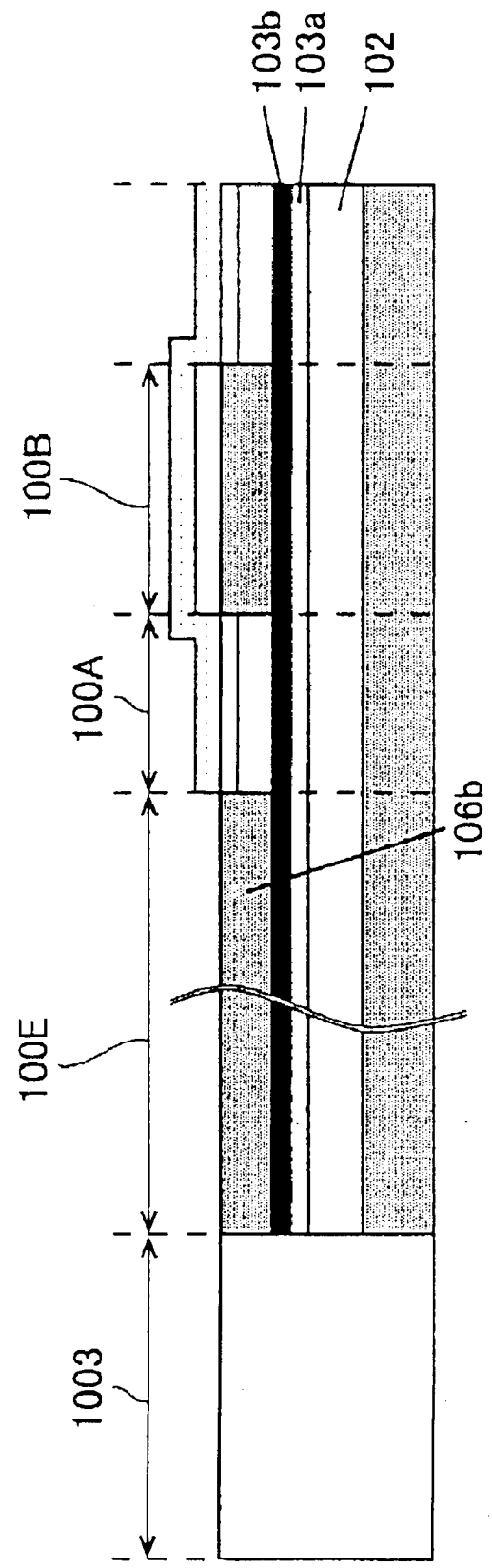
FIG. 27 is a section view showing a layered structure along an optical waveguide between a phase modulation device 1100*v* and an optical coupler 1003 or 1005 in a Mach-Zehnder optical modulator according to the seventh embodiment of the present invention.

FIG. 27 is a section view showing a layered structure of the device along one of the optical waveguides 1004 (also shown in FIG. 1) and between the optical coupler 1003 (also shown in FIG. 1) and a phase modulator 1100v (which is the optical modulator 100 of the first embodiment replacing the conventional optical modulator 1100 shown in FIG. 1 and is therefore numbered "1100v").

Referring to FIG. 27, the optical coupler 1003 is optically connected to the phase modulator 100 (that is made up of the micro optical modulator elements 100A and the gap regions 100B) via an isolation region 100E.

To be more specific about the isolation region 100E, there are the insulating InP substrate 101, the n-InP cladding layer 102, the i-InP layer 103a and the i-MQW optical waveguide core layer 103b, each of which is formed as a single identical layer between the output-side end of the optical coupler 1003 and the phase modulator 100.

Further, there is a SI-InP layer 106b laminated over the i-MQW optical waveguide core layer 103b in the isolation region 100E.

More specifically, a semi-insulating material layer (i.e., the SI-INP layer 106b) is formed on the top face of the i-MQW optical waveguide core layer 103b (which optically connects the optical coupler 1003 to the phase modulator 100), thereby electrically isolating the optical coupler 1003 from the phase modulator 100 in the optical semiconductor device of this embodiment.

Further, this embodiment may alternatively be represented by a variant in which there is one of or a combination of a semi-insulating material layer, a dielectric material layer, an air layer, and a vacuum layer, for example under or both under and on the top face of the i-MQW optical waveguide core layer 103b, thereby electrically isolating the optical coupler 1003 from the phase modulator 100. Such a configuration (not shown in the figures) is an alternative to the above illustrated configuration of providing the semi-insulating material layer formed on the top face of the i-MQW optical waveguide core layer 103b as shown in FIG. 27.

The above description of this embodiment relates mainly to the portion that connects the phase modulator 1100v to the optical coupler 1003. On the other hand, a layered structure between the phase modulator 1100v and the optical coupler 1005 along one optical waveguide 1004 (i.e., along one of the two arms shown in FIG. 1) as well as a still another layered structure between another phase modulator 1100v and the optical coupler 1005 along the other optical waveguide 1004 (i.e., along the other arm shown in FIG. 1) is configured like the layered structure shown in FIG. 27.

Thus, this embodiment can achieve a Mach-Zehnder optical modulator that realizes improved interaction between the semiconductor optical modulators 100 (i.e., phase modulators 1100v) that takes place when electric signals are input into the semiconductor optical modulators 100 located respectively along the optical waveguides 1004 branched from the optical coupler 1003.

8. Eighth Embodiment

As an eighth embodiment of the present invention, a light-absorption type optical modulator device is now described as compared with the phase modulators discussed in the above embodiments employing the principle of the semiconductor optical modulation device of the present invention. In other words, the above embodiments can be modified with light-absorption type optical modulator devices instead of the phase modulators according to the present invention. This is achieved by employing an i-MQW optical waveguide core layer whose MQW has an emission wavelength that is close to the desired wavelength of modulated light in each embodiment.

Figure 28:
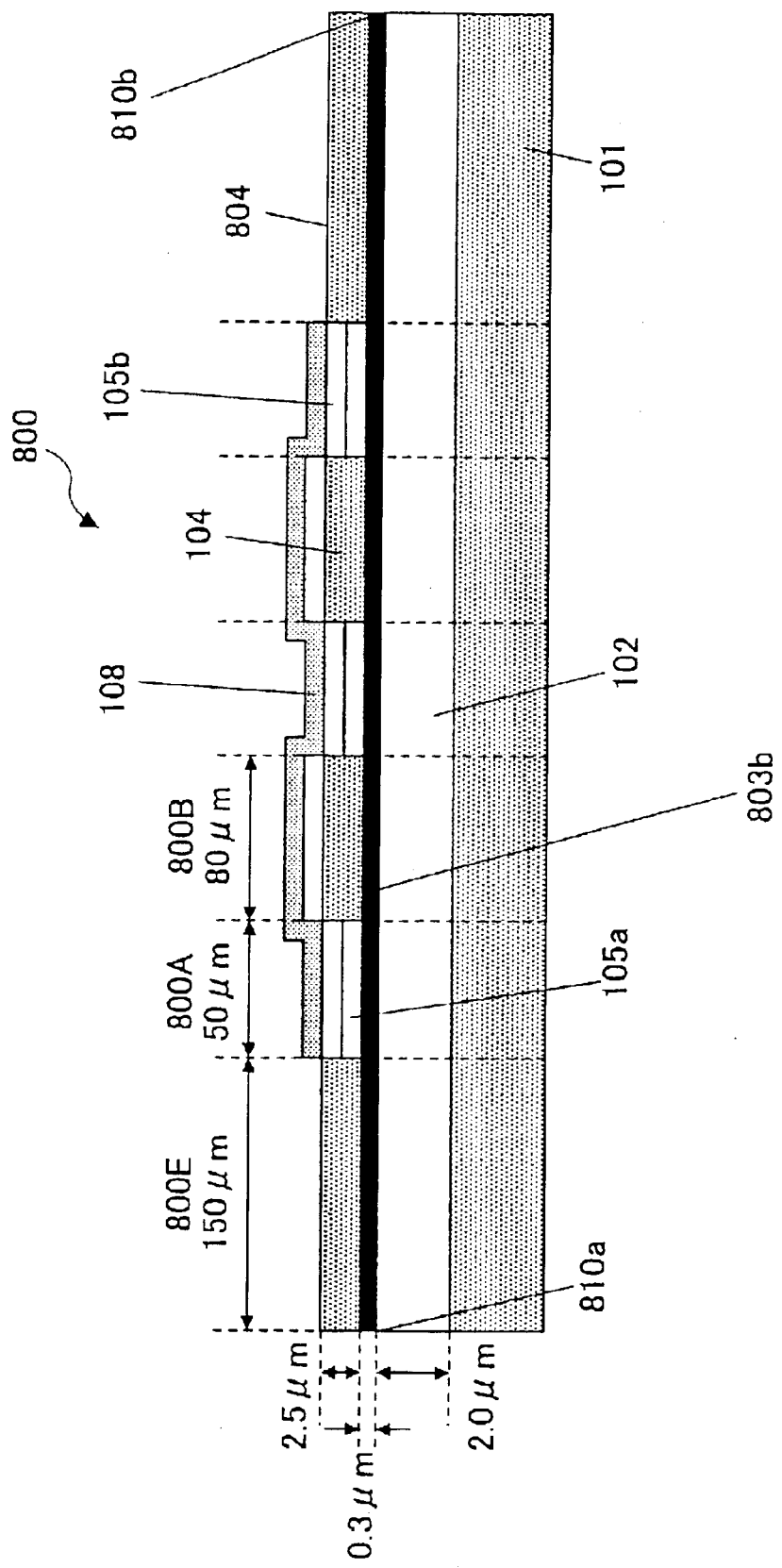
FIG. 28 is a section view showing a layered structure of an electroabsorption-modulation type optical modulation device 800 according to the eighth embodiment of the present invention.

FIG. 28 shows a section taken along the optical axis of an electroabsorption modulator device 800 of this embodiment. An optical waveguide having a sectional structure shown in FIG. 28 constitutes a part of the electroabsorption modulator device. In FIG. 28, a series of three micro electroabsorption modulator elements 800A are shown. Each insulating region 800B sandwiched between two of the three modulator elements 800A optically connects one of the two elements 800A to the other element 800A. Each modulator element 800A is 50.0 micrometers long. Each insulating region 800B is 80.0 micrometers long. Each end of the device 800 is provided with an optical input/output region 800E that is 150.0 micrometers long. As seen in FIG. 28, the thickness of an i-MQW optical waveguide core layer 803b is 0.3 micrometers. It is appropriately designed so that its MQW emission wavelength becomes 1.50 micrometers long. More specifically, there are fifteen well layers in the MQW core layer. Each well layer is made of InGaAsP. Each barrier layer is made of InP. The n-InP cladding layer 102 in this embodiment is formed under and in contact with the i-MQW optical waveguide core layer 803b. The configurations of the micro electroabsorption modulator elements 800A and the insulating regions 800B seen in a section perpendicular to the optical axis in this embodiment are basically similar to the configurations of the elements 100A and 100B as described in the first embodiment with reference to FIGS. 11 and 12, except for those differences that the thickness of the i-MQW optical waveguide core layer 803b is different from that of core layer 103b of the first example and that there is not the i-InP layer 103a under the core layer 803b.

With respect to how this embodiment works, it should be noted that the length of 150.0 micrometers as the micro electroabsorption modulator element total length (i.e., total of the lengths of the elements 800A only) is a sufficiently large value. Thus, the driving voltage for modulation operation of the device of this embodiment may be reduced. Further, since the insulating regions 800B formed among the micro electroabsorption modulator elements 800A have small capacitance, the input impedance of the entire device can be more closely designed to 50 ohms (or other desired values), thereby preventing the electric signals input into the device from being reflected to the drive circuit. As a result, the modulation characteristics are improved.

9. Ninth Embodiment

Figure 29:
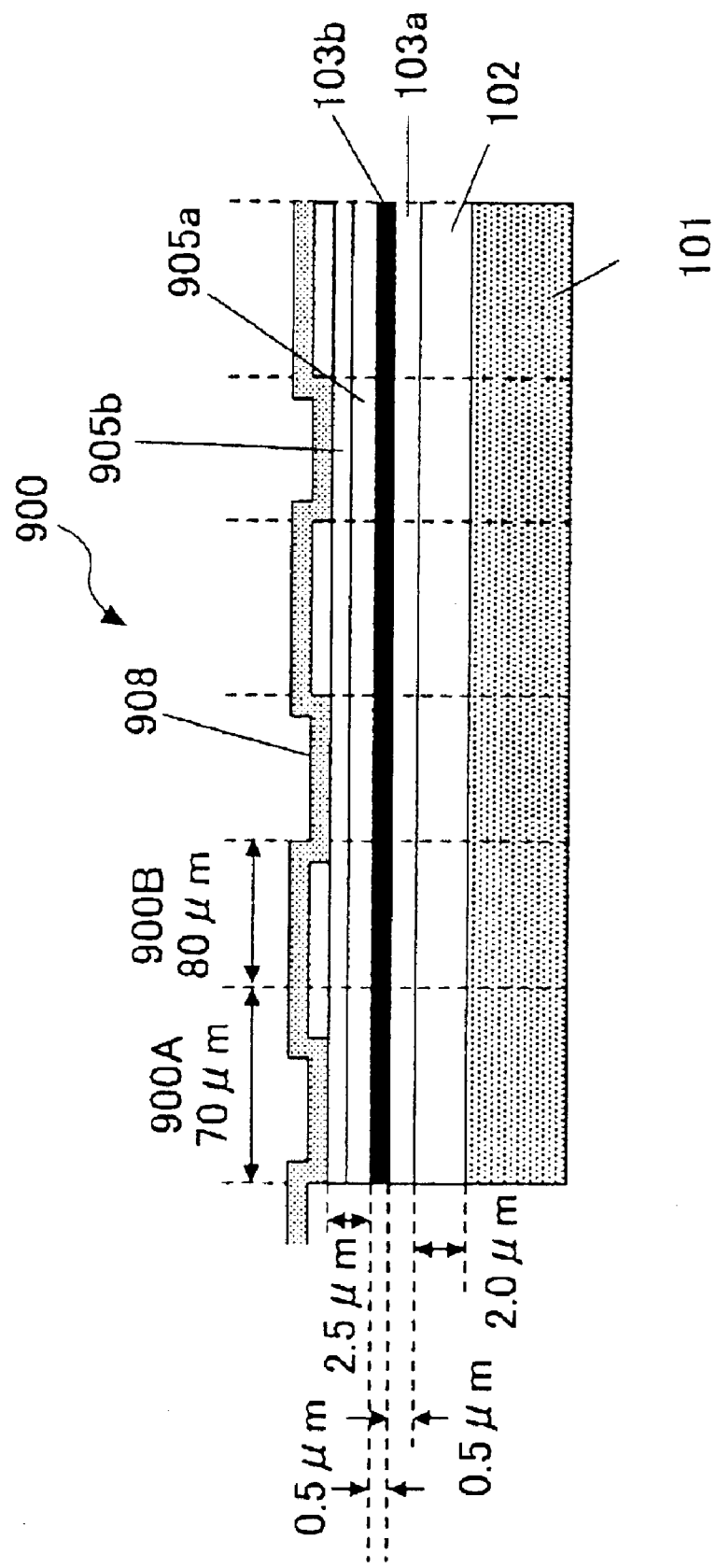
FIG. 29 is a section view showing a layered structure of a semiconductor optical modulation device 900 according to the eighth embodiment of the present invention.
Figure 30:
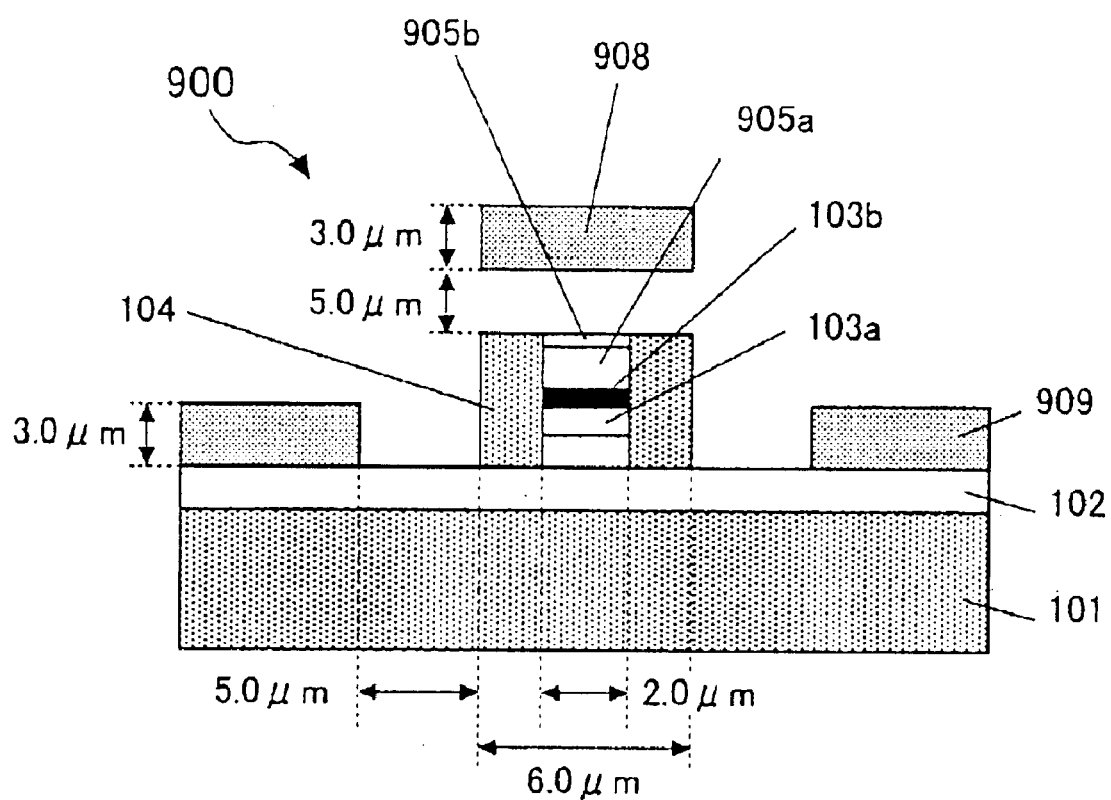
FIG. 30 is a section perpendicular to the optical axis showing a layered structure of the device 900 of FIG. 29.

Next, as a ninth embodiment of the present invention, a semiconductor optical modulation device 900 is described. In FIG. 29, the device 900 shown is a sectional view perpendicular to the insulating InP substrate 101 and parallel to the optical axis of the device 900. FIG. 30 shows the device 900 in a section perpendicular to the optical axis. As shown in these figures, a p-InP cladding layer 905a and a p-InGaAs contact layer 905b formed over the i-MQW optical waveguide core layer 103b in this embodiment, are formed uniformly in the direction parallel to the optical axis. This is unlike the first embodiment, wherein the corresponding layers 105a and 105b are not uniform in a directional sense as shown in FIG. 10. Like in the first embodiment, however, an Au-plated signal electrode 908 is formed in contact with the p-InGaAs contact layer 905b in the regions of micro optical modulator elements 900A (as compared with the elements 100A) and is formed spaced apart from the p-InGaAs contact layer 905b in insulating regions 900B (as compared with the gap regions 100B). Other structures are basically the same as those described in the first embodiment.

The manufacturing method of the device in this embodiment is basically the same as that described in the first embodiment. In this embodiment, however, those manufacturing steps described with reference to the FIGS. 14 and 15 in the first embodiment are omitted.

Now, the manner in which this embodiment works is described. In this embodiment, there is a conductive semiconductor portion over the i-MQW optical waveguide core layer 103b in each insulating region 900B. Therefore, the electric field that takes place in this portion (i.e., in the area above the core layer 103b) when the device 900 is driven with the high frequency electric signals to perform the modulation operation is weak. As a result, the electric field that takes place in the core layer 103b in the insulating region 900B is stronger than in the corresponding structure described in the first embodiment. Thus, the capacitance in this region is greater than in the first embodiment. With that, still, the capacitance of the insulating region 900B is smaller than the micro optical modulator elements 900A because the Au-plated signal electrode 908 in the elements 900A is in contact with the top face of a mesa (that includes the core layer 103b) and the Au-plated signal electrode 908 in the insulating regions 900B is spaced apart from the top surface of the mesa. Thus, this embodiment has high capacitance portions (the micro optical modulator elements 900A) and low capacitance portions (the insulating regions 900B) connected alternately. Consequently, this embodiment also achieves an input impedance of the entire device close to 50 ohms (or a desired value). Further, in the viewpoint of simplification of the manufacturing process, this embodiment may be advantageous as compared to the first embodiment because the steps shown in FIGS. 14 and 15 can be omitted.

Further, this embodiment may alternatively be represented by a variant (not shown in the figures) in which there is provided at least one of a semi-insulating semiconductor layer, a dielectric material layer, a gas layer and a vacuum layer, replacing just some (but not the entire) part of the top portion of the conductive semiconductor above the optical waveguide core layer formed uniformly extending across the micro optical modulator elements 900A and the insulating regions 900B of this embodiment shown in FIGS. 29 and 30. According to this variant, the capacitance of the regions 900B becomes smaller than this embodiment that has the uniform conductive semiconductor. In this sense, the effect of this variant is closer to the first embodiment.

Other Embodiments

In the present invention, locations of the metallic signal electrode and the metallic ground electrode are basically interchangeable with each other. For this reason, appropriate modifications may be made. Thus, locations of the Au-plated signal electrode and the Au-plated ground electrode in each of the above embodiments and variants are interchangeable. More specifically, in accordance with the interchanged locations of the electrodes, the characteristics of some layers, for example, may be changed. The n-InP cladding layers (102, 202, 302 and 402), the p-InP cladding layers (105a, 205a, 305a, 405a and 505a), the p-InGaAs contact layers (105b, 205b, 305b, 405b and 505b) and the n-InP substrate 502 in the illustrated phase modulation devices may be changed into p-InP cladding layers, n-InP cladding layers, n-InGaAs contact layers and a p-InP substrate, respectively.

Further, according to the invention, not only the signal electrodes (metal wiring, for example) can be electrically isolated from the optical waveguide core layers by means of the insulating material layers in the gap regions as shown in the above embodiments. Alternatively, the ground electrodes (metal wiring, for example) instead of the signal electrodes may be electrically isolated from the optical waveguide core layers in a like manner. Further alternatively, both the ground electrodes and the signal electrodes may be electrically isolated from the optical waveguide core layers in the same manner.

The present invention is not limited to the specifically disclosed embodiments, or variants, and variations and modifications may be made without departing from the scope of the present invention.

This application claims priority rights of and is based on Japanese patent application No. 2001-377792 filed on Dec. 11, 2001 in the Japanese Patent Office, the entire contents of which are hereby incorporated by reference.

What is claimed is:

1. A semiconductor optical modulation device as comprising:
    an optical waveguide having an optical axis, said optical waveguide formed on a surface of a semiconductor substrate; and
    at least two types of optical modulation elements formed on said semiconductor substrate,
    wherein said at least two types of optical modulation elements are arrayed so that there are a plurality of said optical modulation elements along said optical waveguide in the direction of said optical axis,
    wherein said two types of optical modulation elements comprise at least one first optical modulation element of a first capacitance and a first element length, and at least one second optical modulation element of a second capacitance and a second element length, and
    said device further comprises a metal wiring that makes an electrical connection of said first optical modulation element with adjacent one spaced apart with the second optical modulation element therebetween,
    wherein said second capacitance is smaller than said first capacitance.

2. The semiconductor optical modulation device as claimed in claim 1, wherein said at least one first optical modulation element comprises an electric field generator part for producing an electric field in said optical waveguide based on an applied electric voltage,
    wherein said electric field generator part comprises:
    a first electrode and a second electrode between which a bias voltage is applied, said electric field being produced as a result of said bias voltage being applied between said first and second electrodes; and
    a conductive semiconductor layer that makes the electric field concentrate into said optical waveguide,
    wherein said conductive semiconductor layer is formed over said optical waveguide.

3. The semiconductor optical modulation device as claimed in claim 2, wherein said electric field generator part comprises a second conductive semiconductor layer that makes the electric field concentrate into said optical waveguide, wherein said second conductive semiconductor layer is formed under said optical waveguide.

4. The semiconductor optical modulation device as claimed in claim 3, wherein said at least one first optical modulation element comprises two second electrodes that are located on said semiconductor substrate symmetrically to each other about a plane defined by said first electrode.

5. The semiconductor optical modulation device as claimed in claim 3, wherein said semiconductor substrate on which said at least one first optical modulation element and said at least one second optical modulation element are formed comprises a conductive semiconductor substrate that is either n-type or p-type, wherein said second electrode is formed on a surface of said semiconductor substrate other than the surface on which the at least one first optical modulation element and the at least one second optical modulation element are formed.

6. The semiconductor optical modulation device as claimed in claim 2, wherein said at least one first optical modulation element comprises two second electrodes that are located on said semiconductor substrate symmetrically to each other about a plane defined by said first electrode.

7. The semiconductor optical modulation device as claimed in claim 2, wherein said semiconductor substrate on which said at least one first optical modulation element and said at least one second optical modulation element are formed comprises a conductive semiconductor substrate that is either n-type or p-type, wherein said second electrode is formed on a surface of said semiconductor substrate other than the surface on which the at least one first optical modulation element and the at least one second optical modulation element are formed.

8. The semiconductor optical modulation device as claimed in claim 1, wherein said at least one first optical modulation element comprises an electric field generator part for producing an electric field in said optical waveguide based on an applied electric voltage,
    wherein said electric field generator part comprises:
    a first electrode and a second electrode between which a bias voltage is applied, said electric field being produced as a result of said bias voltage being applied between said first and second electrodes; and
    a conductive semiconductor layer that makes the electric field concentrate into said optical waveguide,
    wherein said conductive semiconductor layer is formed under said optical waveguide.

9. The semiconductor optical modulation device as claimed in claim 8, wherein said at least one first optical modulation element comprises two second electrodes that are located on said semiconductor substrate symmetrically to each other about a plane defined by said first electrode.

10. The semiconductor optical modulation device as claimed in claim 8, wherein said semiconductor substrate on which said at least one first optical modulation element and said at least one second optical modulation element are formed comprises a conductive semiconductor substrate that is either n-type or p-type, wherein said second electrode is formed on a surface of said semiconductor substrate other than the surface on which the at least one first optical modulation element and the at least one second optical modulation element are formed.

11. The semiconductor optical modulation device as claimed in claim 1, wherein said semiconductor substrate comprises a mesa structure extending parallel to the optical axis,
    wherein said optical waveguide is formed inside the mesa structure, and
    wherein said at least one first optical modulation element comprises a first electrode formed on said mesa structure.

12. The semiconductor optical modulation device as claimed in claim 11, comprising a first semi-insulating semiconductor layer and a second semiconductor layer formed on lateral faces of a core layer in said optical waveguide, wherein the light wave travels via said core layer.

13. The semiconductor optical modulation device as claimed in claim 12, wherein said first electrode is located so as to bridge said first and second semi-insulating semiconductor layers, and further said first and second semi-insulating semiconductor layers are formed on respective sides of said mesa structure.

14. The semiconductor optical modulation device as claimed in claim 11, comprising a conductive semiconductor layer formed on said optical waveguide formed inside said mesa structure,
   wherein said first electrode of said first optical modulation element is formed on said conductive semiconductor layer,
   wherein the width of a surface of said conductive semiconductor layer facing said first electrode is wider than the width of said optical waveguide.

15. The semiconductor optical modulation device as claimed in claim 11, wherein said metal wiring is provided in such a manner as to extend on and along the mesa structure.

16. The semiconductor optical modulation device as claimed in claim 1, wherein said metal wiring forms a bent shape extending in a predetermined direction spaced away from the optical axis, said bent shape located in a region of said at least one second optical modulation element.

17. The semiconductor optical modulation device as claimed in claim 1, comprising a layer that comprises at least one of a semi-insulating semiconductor, a dielectric, a vacuum space and a gas space, said layer being formed between said metal wiring and said optical waveguide.

18. The semiconductor optical modulation device as claimed in claim 1, wherein said first element length is equal to or less than one fourth of the wavelength of high frequency electric signals transmitted in said optical waveguide.

19. The semiconductor optical modulation device as claimed in claim 1, wherein said at least one first optical modulation element, said at least one second optical modulation element and said optical waveguide are formed on said semiconductor substrate in an integrated manner.

20. The semiconductor optical modulation device as claimed in claim 1, wherein said metal wiring has a form of an air bridge bridging the region of said at least one second optical modulation element.

21. The semiconductor optical modulation device as claimed in claim 20, wherein the thickness of said metal wiring is in the range of 2.0 through 10.0 micrometers and the width of the same is in the range of 3.0 through 8.0 micrometers, wherein said air bridge is formed in such a manner that said metal wiring in the region of said second optical modulation element is spaced apart not more than 12.0 micrometers from said second optical modulation element.

22. The semiconductor optical modulation device as claimed in claim 20, wherein the thickness of said metal wiring is in the range of 2.0 through 10.0 micrometers and the width of the same is in the range of 3.0 through 8.0 micrometers, wherein said air bridge is formed in such a manner that said metal wiring in the region of said second optical modulation element is at least partially in contact with said second optical modulation element.

23. The semiconductor optical modulation device as claimed in claim 1, wherein said optical waveguide is adapted to either change the phase of the light wave or absorb the light, based on an electric field produced within said optical waveguide.

24. The semiconductor optical modulation device as claimed in claim 1, wherein a requirement of $t_0 = t_c$ is satisfied, where $t_0$ denotes the time length required for a light wave inputted at a first optical modulation element to arrive at a next first optical modulation element and $t_c$ denotes the time length required for an electric signal inputted at said first optical modulation element to arrive at said next first optical modulation element.

25. The semiconductor optical modulation device as claimed in claim 1, comprising a third semi-insulating semiconductor substrate layer made of undoped InP, Fe-doped InP, undoped GaAs or Fe-doped GaAs, wherein said third semi-insulating semiconductor substrate layer is located between said metal wiring and said optical waveguide in the region of said at least one second optical modulation element.

26. The semiconductor optical modulation device as claimed in claim 1, wherein the length of a first optical modulation element along the optical axis is in the range of 30 through 200 micrometers and the length of a second optical modulation element along the optical axis is in the range of 15 through 650 micrometers.

27. The semiconductor optical modulation device as claimed in claim 2, wherein the ratio of the length of the first optical modulation element along the optical axis to the length of the second optical modulation element along the optical axis is in the range of 1 : 0.5 through 1 : 3.5.

28. The semiconductor optical modulation device as claimed in claim 1, further comprising an insulating semiconductor layer whose thickness is in the range of 0.5 through 2.0 micrometers and whose width is in the range of 1.0 through 3.0 micrometers, and a core layer that transmits a light wave in said optical waveguide at said at least one first optical modulation element, said core layer being formed inside said insulating semiconductor layer.

29. A Mach-Zelmder optical modulation device, comprising:
   a first optical waveguide that comprises first light path;
   a second optical waveguide that comprises a second light path;
   a first coupler that divides an incoming ray of light into said first light path and said second light path;
   a second coupler that couples said first optical waveguide and said second optical waveguide; and
   a first semiconductor optical modulation device of claim 1, said semiconductor optical modulation device of claim 1 formed along said first optical waveguide.

30. A Mach-Zehnder optical modulation device, comprising:
   a first optical waveguide that comprises first light path;
   a second optical waveguide that comprises a second light path;
   a first coupler that divides an incoming ray of light into said first light path and said second light path;
   a second coupler that couples said first optical waveguide and said second optical waveguide;
   a semiconductor optical modulation device of claim 1, formed along said first optical waveguide;
   another semiconductor optical modulation device of claim 1, formed along said second optical waveguide; and
   an isolation region between said first or second couplers and one of said semiconductor optical modulation devices, wherein said isolation region isolates electrically said first or second coupler from said semiconductor optical modulation device located along said first or second optical waveguide.

31. The Mach-Zehnder optical modulation device as claimed in claim 30, comprising a layer that includes at least one of a semi-insulating semiconductor, a dielectric, a vacuum space and a gas space, wherein said layer is formed over said optical waveguide in said isolation region.

32. A semiconductor optical modulation device comprising:
- an optical waveguide having an optical axis, said optical waveguide formed on a surface of a semiconductor substrate; and
- at least two types of optical modulation elements formed on said semiconductor substrate,
- wherein said at least two types of optical modulation elements are arrayed so that there are a plurality of said optical modulation elements along said optical waveguide in the direction of said optical axis,
- further comprising a semiconductor laser optically connected to one of said optical modulation elements via said optical waveguide, said semiconductor laser being formed on said semiconductor substrate.

33. The semiconductor optical modulation device as claimed in claim 32, comprising an isolation region between said semiconductor laser and said at least one first optical modulation element or said at least one second optical modulation element that isolates electrically said semiconductor laser from said at least one first optical modulation element or said at least one second optical modulation element.

34. The semiconductor optical modulation device as claimed in claim 33, comprising a layer that includes at least one of a semi-insulating semiconductor, a dielectric, a vacuum space and a gas space, wherein said layer is formed over said optical waveguide in said isolation region.

35. A semiconductor optical modulation device as comprising:
- an optical waveguide having an optical axis, said optical waveguide formed on a surface of a semiconductor substrate; and
- at least two types of optical modulation elements formed on said semiconductor substrate,
- wherein said at least two types of optical modulation elements are arrayed so that there are a plurality of said optical modulation elements along said optical waveguide in the direction of said optical axis,
- wherein said semiconductor substrate is made of InP, and said optical waveguide is made of a material that is lattice-matching with said InP to such an extent that its lattice mismatching ratio be not more than 1.0 percent.

36. The semiconductor optical modulation device comprising:
- an optical waveguide having an optical axis, said optical waveguide formed on a surface of a semiconductor substrate; and
- at least two types of optical modulation elements formed on said semiconductor substrate,
- wherein said at least two types of optical modulation elements are arrayed so that there are a plurality of said optical modulation elements along said optical waveguide in the direction of said optical axis,
- wherein said semiconductor substrate is made of GaAs, and said optical waveguide is made of a material that is lattice-matching with said GaAs to such an extent that its lattice mismatching ratio be not more than 1.0 percent.

37. The semiconductor optical modulation device comprising:
- an optical waveguide having an optical axis, said optical waveguide formed on a surface of a semiconductor substrate; and
- at least two types of optical modulation elements formed on said semiconductor substrate,
- wherein said at least two types of optical modulation elements are arrayed so that there are a plurality of said optical modulation elements along said optical waveguide in the direction of said optical axis,
- further comprising a core layer that transmits a light wave in said optical waveguide, the core layer comprising a multi quantum well layer having an InGaAsP well, wherein said optical waveguide has an equivalent refractive index in the range of 3.2 through 3.3 for the light wave whose wavelength in vacuum is in the range of 1.50 through 1.60 micrometers.

38. A method of manufacturing a semiconductor optical modulation device, comprising:
a) a first step of forming an optical waveguide layer on a first semiconductor layer, wherein said first semiconductor layer is of a first conductivity type;
b) a second step of fanning a second semiconductor layer on said optical waveguide layer, wherein said second semiconductor layer is of a second conductivity type;
c) a third step of forming a plurality of spaced-apart recessed areas at predetermined intervals by patterning said second semiconductor layer;
d) a fourth step of filling up said recessed areas with a semi-insulating semiconductor layer;
e) a fifth step of forming a mesa structure by patterning a surface, said surface being formed in said fourth step and being defined by said second semiconductor layer and said semi-insulating semiconductor layer that exist alternately and repeatedly at said predetermined intervals; and
f) a sixth step of forming a metal wiring on said mesa structure, bringing said metal wiring into contact with said second semiconductor layer.

39. The method of manufacturing a semiconductor optical modulation device as claimed in claim 38, wherein a semi-insulating semiconductor layer of a predetermined width is formed on both sides of the mesa structure formed in said fifth step and after that said metal wiring is formed in said sixth step.

* * * * *